(12) United States Patent
Yang et al.

(10) Patent No.: US 10,149,025 B2
(45) Date of Patent: Dec. 4, 2018

(54) OPTICAL PACKET SENDING METHOD AND DEVICE, OPTICAL PACKET PROCESSING METHOD, AND OPTICAL SWITCHING DEVICE

(71) Applicant: Huawei Technologies Co., Ltd., Shenzhen (CN)

(72) Inventors: Xiaoling Yang, Shenzhen (CN); Yan Wang, Shenzhen (CN); Huixiao Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/367,458

(22) Filed: Dec. 2, 2016

(65) Prior Publication Data

US 2017/0085971 A1    Mar. 23, 2017

Related U.S. Application Data

(63) Continuation of application No. PCT/CN2014/079085, filed on Jun. 3, 2014.

(51) Int. Cl.
*H04Q 11/00* (2006.01)
*H04L 12/723* (2013.01)
*H04L 7/00* (2006.01)

(52) U.S. Cl.
CPC ....... *H04Q 11/0062* (2013.01); *H04L 7/0075* (2013.01); *H04L 45/50* (2013.01);
(Continued)

(58) Field of Classification Search
CPC .......... H04Q 11/0062; H04Q 11/0066; H04Q 2011/0083; H04Q 2011/0086; G04Q 2011/0077
(Continued)

(56) References Cited

U.S. PATENT DOCUMENTS 6,493,120 B1    12/2002 Tancevski
6,665,495 B1 *  12/2003 Miles ............... H04L 45/00
                                                        370/351
(Continued)

FOREIGN PATENT DOCUMENTS

CN    1343082 A     4/2002
CN    101005330 A   7/2007
(Continued)

OTHER PUBLICATIONS

Li et al., "Parallel Transfer Optical Packet Switches," IEEE Journal of Lightwave Technology, vol. 27, No. 12, pp. 2159-2168, Institute of Electrical and Electronics Engineers, New York, New York (Jun. 15, 2009).

(Continued)

*Primary Examiner* — Oommen Jacob
(74) *Attorney, Agent, or Firm* — Leydig, Woit & Mayer, Ltd.

(57) ABSTRACT

Embodiments of the present invention provide an sending device includes: a processor, configured to obtain a first optical packet payload and/or a third optical label, and obtain a second optical label and a second optical packet payload corresponding to the second optical label; and an exporter, configured to send to an optical switching device, within a guard time between a moment for sending the second optical label and a moment for sending the second optical packet payload, the third optical label and/or the first optical packet payload that are/is obtained by the processor, so that the optical switching device performs, according to the third optical label, switch processing on a third optical packet payload corresponding to the third optical label, and/or the optical switching device performs switch processing on the first optical packet payload according to a first (Continued)

optical label corresponding to the first optical packet payload.

18 Claims, 12 Drawing Sheets

(52) U.S. Cl.
CPC . *H04Q 11/0066* (2013.01); *H04Q 2011/0077* (2013.01); *H04Q 2011/0083* (2013.01); *H04Q 2011/0086* (2013.01)

(58) Field of Classification Search
USPC .................................................. 398/51, 56
See application file for complete search history.

(56) References Cited

U.S. PATENT DOCUMENTS

| | | | | |
|---|---|---|---|---|
| 6,721,315 | B1* | 4/2004 | Xiong | H04L 49/254 370/389 |
| 8,068,484 | B2* | 11/2011 | Youn | H04L 47/32 370/389 |
| 8,897,638 | B2* | 11/2014 | Kitajima | H04J 14/0267 398/27 |
| 8,971,321 | B2* | 3/2015 | Graves | H04Q 11/0005 370/389 |
| 2002/0141015 | A1* | 10/2002 | Chang | H04Q 11/0062 398/98 |
| 2002/0191251 | A1* | 12/2002 | Ferguson | H04Q 11/0005 398/101 |
| 2004/0151171 | A1* | 8/2004 | Lee | H04J 14/0209 370/380 |
| 2004/0213571 | A1* | 10/2004 | Penninckx | H04Q 11/0005 398/56 |
| 2005/0281217 | A1 | 12/2005 | Mottier | |
| 2006/0056452 | A1* | 3/2006 | Ciavaglia | H04J 14/0227 370/468 |
| 2006/0172713 | A1* | 8/2006 | Suzuki | H04L 27/2605 455/103 |
| 2007/0014579 | A1 | 1/2007 | Buchali | |
| 2012/0148242 | A1* | 6/2012 | Chen | H04J 14/0254 398/49 |
| 2013/0028346 | A1* | 1/2013 | Hottinen | H04W 16/14 375/285 |
| 2014/0205292 | A1* | 7/2014 | Mori | H04O 11/0005 398/54 |
| 2015/0365337 | A1* | 12/2015 | Pannell | H04J 3/0697 370/503 |
| 2017/0085971 | A1* | 3/2017 | Yang | H04Q 11/0066 |

FOREIGN PATENT DOCUMENTS

| | | |
|---|---|---|
| CN | 101582718 A | 11/2009 |
| CN | 101977336 A | 2/2011 |
| CN | 102231864 A | 11/2011 |
| JP | 2000244576 A | 9/2000 |
| JP | 2006005932 A | 1/2006 |
| JP | 2012209877 A | 10/2012 |
| KR | 20030096714 A | 12/2003 |
| WO | 2004080110 A1 | 9/2004 |

OTHER PUBLICATIONS

Hautegem et al., "OPS/OBS Scheduling Algorithms: Incorporating a Wavelength Conversion Cost in the Performance Analysis," IEEE Performance Computing and Communications Conference, Institute of Electrical and Electronics Engineers, New York, New York (2013).

* cited by examiner

OPTICAL PACKET SENDING METHOD AND DEVICE, OPTICAL PACKET PROCESSING METHOD, AND OPTICAL SWITCHING DEVICE

CROSS-REFERENCE TO RELATED APPLICATIONS

This application is a continuation of International Application No. PCT/CN2014/079085, filed on Jun. 3, 2014, the disclosure of which is hereby incorporated by reference in its entirety.

TECHNICAL FIELD

The present invention relates to the field of optical switching technologies, and in particular, to an optical packet sending method and device, an optical packet processing method, and an optical switching device.

BACKGROUND

At present, there is an optical label serial transmission solution in an optical packet switching (OPS) system, that is, an edge device processes a to-be-switched optical packet signal, and sends an optical label and an optical packet payload to an optical switching device in a serial manner. Referring to FIG. 1, FIG. 1 is a schematic diagram of a time sequence of optical label serial transmission in the prior art. As shown in the figure, an optical label and a corresponding optical packet payload are separate by time, the optical label is sent first, and then the corresponding optical packet payload is sent. A time interval is reserved between a moment for sending the optical label and a moment for sending the optical packet payload. The time interval is referred to as a guard time, and the guard time needs to be greater than or equal to a period of time that the optical switching device requires to receive the optical label, generate a control signal, and set up an optical link for transmitting the optical packet payload.

However, generally, the guard time needs approximately one hundred nanoseconds. When the optical switching device needs to operate a complex algorithm to set up an optical link, a longer guard time is required. Within the guard time, no valid data is transmitted over a link between the edge device and the optical switching device. Therefore, a link resource is wasted and link resource usage is low.

SUMMARY

In view of this, embodiments of the present invention provide an optical packet sending method and device, an optical packet processing method, and an optical switching device, which can improve transmission link usage of an optical label and an optical packet payload.

According to a first aspect, an embodiment of the present invention provides an optical packet sending device, including:

a processor, configured to obtain a first optical packet payload and/or a third optical label, and obtain a second optical label and a second optical packet payload corresponding to the second optical label; and an exporter, configured to send to an optical switching device, within a guard time between a moment for sending the second optical label and a moment for sending the second optical packet payload, the third optical label and/or the first optical packet payload that are/is obtained by the processor, so that the optical switching device performs, according to the third optical label, switch processing on a third optical packet payload corresponding to the third optical label, and/or the optical switching device performs switch processing on the first optical packet payload according to a first optical label corresponding to the first optical packet payload; where the second optical label is sent first and the second optical packet payload is sent later; the first optical packet payload is an optical packet payload corresponding to the first optical label that has been sent before the second optical label is sent; and the third optical label is an optical label corresponding to the third optical packet payload following the second optical packet payload.

In a first possible implementation manner of the first aspect, the processor specifically includes:

a first converter, configured to receive an input first optical signal, and perform optical-to-electrical conversion processing on the first optical signal to obtain an electrical signal;

a parser, configured to perform parsing processing on the electrical signal obtained by the first converter to obtain a first data frame and/or routing information of a third data frame and obtain a second data frame and routing information of the second data frame; and a first generator, configured to generate the third optical label according to the routing information that is of the third data frame and obtained by the parser, and/or a second generator, configured to generate the first optical packet payload according to the first data frame obtained by the parser; where the first generator is further configured to generate the second optical label according to the routing information that is of the second data frame and obtained by the parser; and the second generator is further configured to generate the second optical packet payload according to the second data frame obtained by the parser.

With reference to the first aspect or the first possible implementation manner of the first aspect, in a second possible implementation manner of the first aspect, the exporter specifically includes a scheduler, a sub-exporter, and a second converter; where the scheduler is configured to monitor the first generator and obtain a generation status of the third optical label, and/or is configured to monitor the second generator and obtain a generation status of the first optical packet payload, where the generation status includes a generated state or a non-generated state;

the scheduler is further configured to determine, after the second optical label is sent, a first sending moment of the first optical packet payload and/or a third sending moment of the third optical label within the guard time according to the generation status of the first optical packet payload and/or a generation status of the first optical label;

the scheduler is further configured to enable a preset timer after the second optical label is sent, where the timer starts timing;

the scheduler is further configured to generate a first control instruction when the timer reaches the first sending moment, and/or is further configured to generate a third control instruction when the timer reaches the third sending moment;

the sub-exporter is configured to send the first optical packet payload to the second converter according to the first control instruction generated by the scheduler, and/or is configured to send the third optical label to the second converter according to the third control instruction generated by the scheduler; and the second converter is configured to perform electrical-to-optical conversion processing on the third optical label and/or the first optical packet payload that are/is sent by the sub-exporter, to obtain a corresponding second optical signal and send the second optical signal to the optical switching device.

With reference to the first possible implementation manner of the first aspect, in a third possible implementation manner of the first aspect, the exporter specifically includes a scheduler and a second converter; where the scheduler is configured to monitor the first generator and obtain a generation status of the third optical label, and/or is configured to monitor the second generator and obtain a generation status of the first optical packet payload, where the generation status includes a generated state or a non-generated state;

the scheduler is further configured to determine, after the second optical label is sent, a first sending moment of the first optical packet payload and/or a third sending moment of the third optical label within the guard time according to the generation status of the first optical packet payload and/or the generation status of the third optical label;

the scheduler is further configured to enable a preset timer after the second optical label is sent, where the timer starts timing;

the scheduler is further configured to generate a first control instruction when the timer reaches the first sending moment, and/or is further configured to generate a third control instruction when the timer reaches the third sending moment;

the first generator is further configured to send the third optical label to the second converter according to the third control instruction generated by the scheduler, and/or the second generator is further configured to send the first optical packet payload to the second converter according to the first control instruction generated by the scheduler; and the second converter is further configured to perform electrical-to-optical conversion processing on the third optical label that is sent by the first generator and/or the first optical packet payload that is sent by the second generator, to obtain a corresponding second optical signal and send the second optical signal to the optical switching device.

With reference to the second possible implementation manner of the first aspect or the third possible implementation manner of the first aspect, in a fourth possible implementation manner of the first aspect, the scheduler is specifically configured to:

enable the preset timer after the second optical label is sent, so that the timer starts timing;

when the timer reaches preset first duration, determine that the timer reaches the first sending moment of the first optical packet payload, and generate the first control instruction of the first optical packet payload; and when the timer reaches preset second duration, determine that the timer reaches the third sending moment of the third optical label; and if the third optical label is generated, generate the third control instruction of the third optical label; or if the third optical label is not generated, generate a second control instruction of the second optical packet payload, and after the third optical label is generated, generate the third control instruction of the third optical label.

With reference to the first possible implementation manner of the first aspect, in a fifth possible implementation manner of the first aspect, the first generator is specifically configured to:

generate the first optical label according to the routing information of the data frame and a preset optical label format; where the first optical label includes an optical label delimiter, destination port information, priority information, and length information, where the optical label delimiter is used to indicate a start location of the first optical label; the destination port information is used to indicate a destination port of the first optical packet payload corresponding to the first optical label; the priority information is used to indicate a priority of the first optical packet payload corresponding to the first optical label; and the length information is used to indicate a length of the first optical label.

With reference to the first possible implementation manner of the first aspect, in a sixth possible implementation manner of the first aspect, the second generator is specifically configured to:

generate the first optical packet payload according to the data frame and a preset optical packet payload format; where the first optical packet payload includes an end character, the data frame, a start character, and a preamble, where the end character is used to indicate a start location of the data frame; the start character is used to indicate an end location of the data frame; and the preamble is used by a receiving device to perform clock synchronization processing according to the preamble to receive the data frame accurately.

According to a second aspect, an embodiment of the present invention further provides an optical switching device, including:

a controller, configured to receive a third optical label and/or a first optical packet payload that are/is sent by an optical packet sending device within a guard time between a moment for sending a second optical label and a moment for sending a corresponding second optical packet payload, where the second optical label is sent first and the second optical packet payload is sent later; the first optical packet payload is an optical packet payload corresponding to a first optical label that has been sent before the second optical label is sent; and the third optical label is an optical label corresponding to a third optical packet payload following the second optical packet payload; where the controller obtains corresponding third control information according to the third optical label, where the third control information is used by an optical switch matrix to perform, according to the third control information obtained by the controller, switch processing on the third optical packet payload corresponding to the third optical label; and/or the optical switch matrix is configured to perform switch processing on the first optical packet payload according to first control information, where the first control information is obtained by the controller according to the first optical label.

In a first possible implementation manner of the second aspect, the controller is specifically configured to obtain the corresponding third control information according to the third optical label, and send the third control information to the optical switch matrix according to preset first duration; and the optical switch matrix is specifically configured to: according to the third control information sent by the controller, set up an optical link for transmitting the third optical packet payload; and after the third optical packet payload is obtained, perform, by using the optical link, switch processing on the third optical packet payload corresponding to the third optical label.

With reference to the first possible implementation manner of the second aspect, in a second possible implementation manner of the second aspect, the controller is specifically configured to obtain the corresponding third control information according to the third optical label, and send the third control information to the optical switch matrix according to preset first duration; and the optical switch matrix is specifically configured to: according to the third control information sent by the controller, set up an optical link for transmitting the third optical packet payload; and after the third optical packet payload is obtained, perform, by using the optical link, switch processing on the third optical packet payload corresponding to the third optical label.

With reference to the second possible implementation manner of the second aspect, in a third possible implementation manner of the second aspect, that the controller sends the third control information to the optical switch matrix according to the preset first duration specifically includes: enabling a timer after the third control information is obtained, where the timer starts timing; and sending the third control information to the optical switch matrix when the timer reaches the first duration.

With reference to the second possible implementation manner of the second aspect, in a fourth possible implementation manner of the second aspect, the third optical label includes length information, and that the controller sends the third control information to the optical switch matrix according to the preset first duration specifically includes:

comparing length information included in a previous optical label of the third optical label with a preset length threshold; and if the length information is less than or equal to the length threshold, sending the third control information to the optical switch matrix; or if the length information is greater than the length threshold, enabling a timer after the third control information is obtained, where the timer starts timing; and when the timer reaches the first duration, sending the third control information to the optical switch matrix.

According to a third aspect, an embodiment of the present invention provides an optical packet sending method, including:

obtaining a first optical packet payload and/or a third optical label;

obtaining a second optical label and a second optical packet payload corresponding to the second optical label; and sending, within a guard time between a moment for sending the second optical label and a moment for sending the second optical packet payload, the obtained third optical label and/or first optical packet payload to an optical switching device, so that the optical switching device performs, according to the third optical label, switch processing on a third optical packet payload corresponding to the third optical label, and/or the optical switching device performs switch processing on the first optical packet payload according to a first optical label corresponding to the first optical packet payload; where the second optical label is sent first and the second optical packet payload is sent later; the first optical packet payload is an optical packet payload corresponding to the first optical label that has been sent before the second optical label is sent; and the third optical label is an optical label corresponding to the third optical packet payload following the second optical packet payload.

In a first possible implementation manner of the third aspect, where the sending, within a guard time between a moment for sending the second optical label and a moment for sending the second optical packet payload, the obtained third optical label and/or first optical packet payload to an optical switching device includes:

monitoring the first generator and obtaining a generation status of the third optical label, and/or monitoring the second generator and obtaining a generation status of the first optical packet payload, where the generation status includes a generated state or a non-generated state;

determining, after the second optical label is sent, a first sending moment of the first optical packet payload and/or a third sending moment of the third optical label within the guard time according to the generation status of the first optical packet payload and/or a generation status of the first optical label;

enabling a preset timer after the second optical label is sent, where the timer starts timing;

when the timer reaches the first sending moment, performing electrical-to-optical conversion processing on the first optical packet payload to obtain a corresponding second optical signal; and/or when the timer reaches the third sending moment, performing electrical-to-optical conversion processing by the third optical label to obtain a corresponding second optical signal; and sending the second optical signal to the optical switching device.

With reference to the first possible implementation manner of the third aspect, in a second possible implementation manner of the third aspect, the determining a first sending moment of the first optical packet payload and/or a third sending moment of the third optical label within the guard time according to the generation status of the first optical packet payload and/or a generation status of the first optical label includes:

enabling the preset timer after the second optical label is sent, so that the timer starts timing;

when the timer reaches preset first duration, determining to send the first optical packet payload; and when the timer reaches preset second duration, and the third optical label is generated, determining to send the third optical label; or if the third optical label is not generated, determining to send the second optical packet payload, and after the third optical label is generated, determining to send the third optical label.

According to a fourth aspect, an embodiment of the present invention further provides an optical packet processing method, including:

receiving a third optical label and/or a first optical packet payload that are/is sent by an optical packet sending device within a guard time between a moment for sending a second optical label and a moment for sending a corresponding second optical packet payload, where the second optical label is sent first and the second optical packet payload is sent later; the first optical packet payload is an optical packet payload corresponding to a first optical label that has been sent before the second optical label is sent; and the third optical label is an optical label corresponding to a third optical packet payload following the second optical packet payload; and obtaining corresponding third control information according to the third optical label; performing, according to the third control information, switch processing on the third optical packet payload corresponding to the third optical label; and/or performing switch processing on the first optical packet payload according to first control information, where the first control information is obtained according to the first optical label.

In a first possible implementation manner of the fourth aspect, the performing, according to the third control information, switch processing on the third optical packet payload corresponding to the third optical label includes:

setting up, according to preset first duration and the third control information, an optical link for transmitting the third optical packet payload; and performing, by using the optical link, switch processing on the third optical packet payload corresponding to the third optical label.

With reference to the first possible implementation manner of the fourth aspect, in a second possible implementation manner of the fourth aspect, the performing switch processing on the first optical packet payload according to first control information includes:

enabling a timer after the first control information is obtained, so that the timer starts timing; and when the timer reaches the first duration, setting up, according to the first control information, an optical link for transmitting the first optical packet payload.

With reference to the first possible implementation manner of the fourth aspect, in a third possible implementation manner of the fourth aspect, the third optical label includes length information, and the setting up, according to preset first duration and the third control information, an optical link for transmitting the third optical packet payload includes:

comparing length information included in a previous optical label of the third optical label with a preset length threshold; and if the length information is less than or equal to the length threshold, setting up, according to the third control information, the optical link for transmitting the third optical packet payload; or if the length information is greater than the length threshold, enabling a timer after the third control information is obtained, so that the timer starts timing; and when the timer reaches the first duration, setting up, according to the third control information, the optical link for transmitting the third optical packet payload.

With reference to the second possible implementation manner of the fourth aspect, in a fourth possible implementation manner of the fourth aspect, In the foregoing technical solutions, within a guard time between a moment for sending an optical label and a moment for sending a corresponding optical packet payload, another optical label and/or another optical packet payload can be transmitted; the another optical packet payload is an optical packet payload corresponding to another optical label that has been sent before the optical label is sent, and the another optical label is an optical label corresponding to another optical packet payload following the optical packet payload; and a corresponding optical link can be set up according to an optical label transmitted in advance, thereby reducing a waste of a link resource between an edge device and an optical switching device within the guard time and improving usage of the link resource.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the technical solutions in the present invention more comprehensible, the following describes the embodiments of the present invention in detail with reference to the accompanying drawings.

It should be clear that the described embodiments are merely a part rather than all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

It should be understood that, although terms such as "first", "second", and "third" may be used in the embodiments of the present invention to describe various duration, optical labels, and optical packet payloads, the duration, the optical labels, and the optical packet payloads should not be limited to these terms. These terms are merely used to differentiate the duration, the optical labels, and the optical packet payloads. For example, without departing from the scope of the embodiments of the present invention, a first optical label may also be referred to as a second optical label, and similarly, a second optical label may also be referred to as a first optical label.

Depending on the context, for example, word "if" used herein may be explained as "while" or "when" or "in response to determining" or "in response to detection". Similarly, depending on the context, phrase "if determining" or "if detecting (a stated condition or event)" may be explained as "when determining" or "in response to determining" or "when detecting (the stated condition or event)" or "in response to detection (the stated condition or event)".

Figure 1:
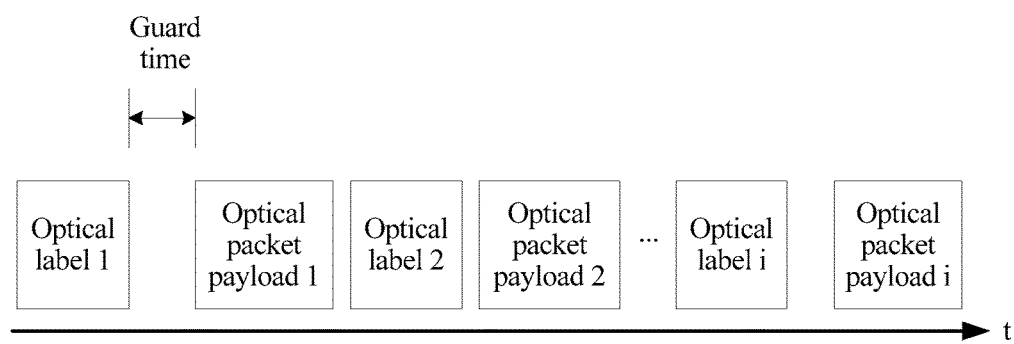
FIG. 1 is a schematic diagram of a time sequence of optical label serial transmission in the prior art.
Figure 2:
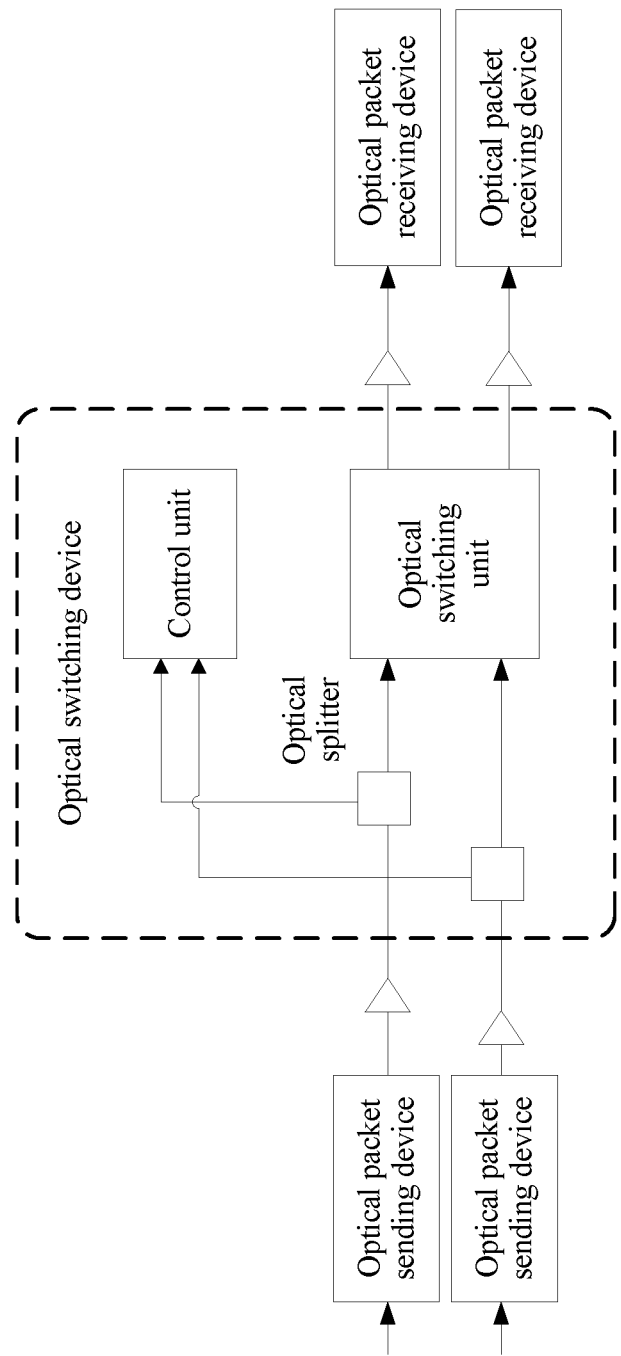
FIG. 2 is a functional block diagram of an optical packet transmission system according to an embodiment of the present invention.

Referring to FIG. 2, FIG. 2 is a functional block diagram of an optical packet transmission system according to an embodiment of the present invention. As shown in the figure, the optical packet transmission system includes an optical packet sending device, an optical switching device, and an optical packet receiving device. The optical packet sending device and the optical packet receiving device are located between a user side device and the optical switching device; or the optical packet sending device and the optical packet receiving device are integrated into a user side device. The user side device may be a server, a cabinet top device, or the like. Each user side device is corresponding to one group of optical packet sending device and optical packet receiving device. An optical packet sending device corresponding to a user side device is configured to send an optical label and/or an optical packet payload to the optical switching device. After the optical packet payload is processed by the optical switching device, the optical packet payload is sent to an optical packet receiving device corresponding to another user side device.

In optical switching technologies, transmitted optical data is divided into optical packets. Each optical packet includes one packet header, and the packet header is an optical label in this embodiment of the present invention. A rest part, except the packet header, of the optical packet is an optical packet payload in this embodiment of the present invention. The packet header is used to indicate a destination port to which the packet is sent. The optical switching device forwards the packet to the destination port according to a packet header of each packet. This process is referred to as optical packet switching.

Figure 3:
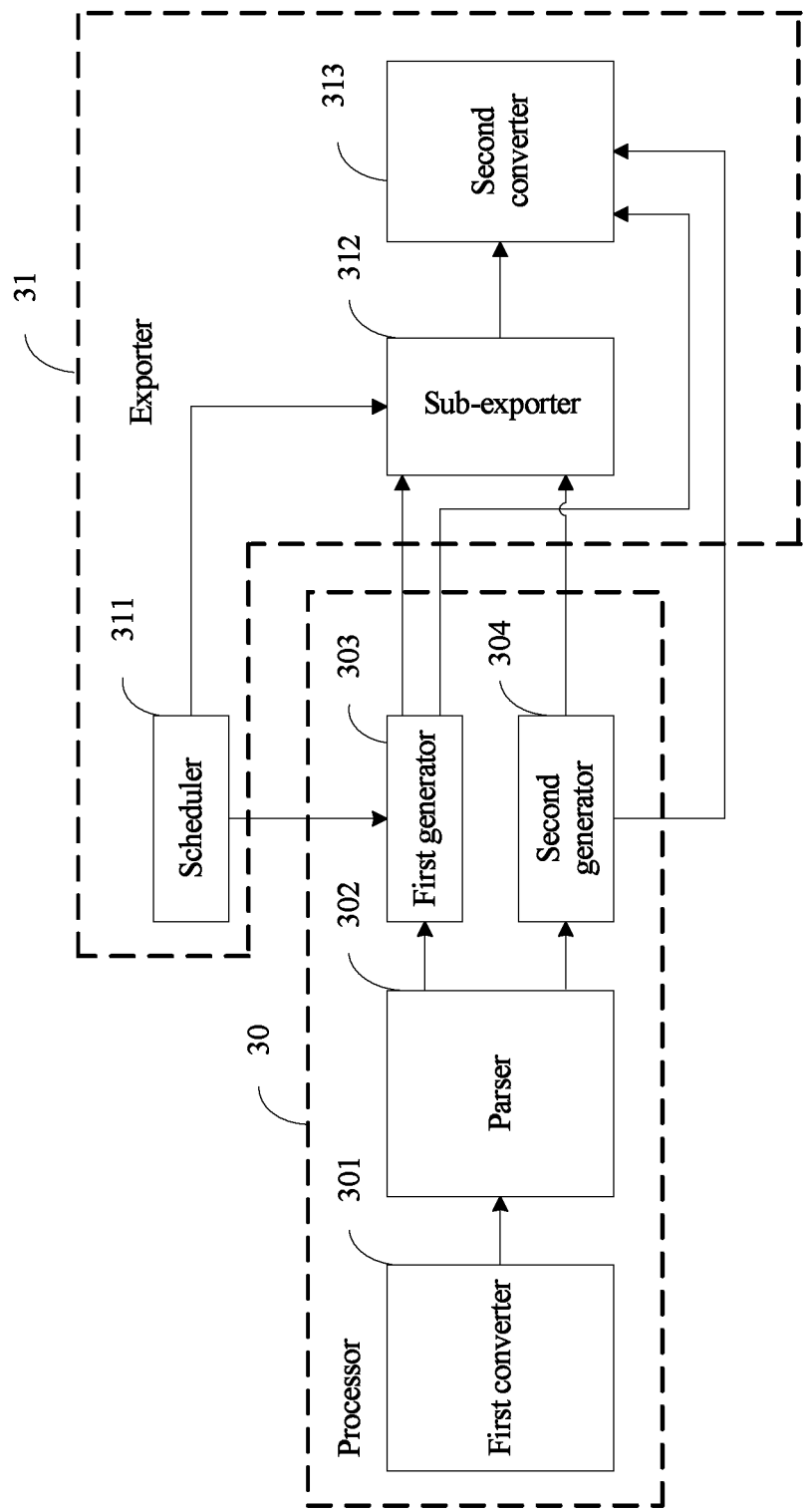
FIG. 3 is a functional block diagram of an optical packet sending device according to an embodiment of the present invention.

Referring to FIG. 3, FIG. 3 is a functional block diagram of an optical packet sending device according to an embodiment of the present invention. As shown in the figure, the optical packet sending device includes:

a processor 30, configured to obtain a first optical packet payload and/or a third optical label, and obtain a second optical label and a second optical packet payload corresponding to the second optical label; and an exporter 31, configured to send, within a guard time between a moment for sending the second optical label and a moment for sending the second optical packet payload, the third optical label and/or the first optical packet payload that are/is obtained by the processor 30 to an optical switching device, so that the optical switching device performs, according to the third optical label, switch processing on a third optical packet payload corresponding to the third optical label, and/or the optical switching device performs switch processing on the first optical packet payload according to a first optical label corresponding to the first optical packet payload.

The second optical label is sent first and the second optical packet payload is sent later; the first optical packet payload is an optical packet payload corresponding to the first optical label that has been sent before the second optical label is sent; and the third optical label is an optical label corresponding to the third optical packet payload following the second optical packet payload.

Preferably, the processor 30 further includes a first converter 301, a parser 302, a first generator 303, and a second generator 304.

Preferably, the exporter 31 further includes a scheduler 311, a sub-exporter 312, and a second converter 313; or the exporter 31 further includes a scheduler 311 and a second converter 313.

The first converter 301 is configured to receive an input first optical signal, and perform optical-to-electrical conversion processing on the first optical signal to obtain an electrical signal. Specifically, the first converter 301 receives, by using an optical medium between the first converter 301 and a user side device, the first optical signal sent by the user side device; performs optical-to-electrical conversion processing on the first optical signal to obtain the corresponding electrical signal; and then sends the obtained electrical signal to the parser 302.

The parser 302 is configured to perform parsing processing on the electrical signal obtained by the first converter 301 to obtain a first data frame and/or routing information of a third data frame and obtain a second data frame and routing information of the second data frame.

Specifically, the parser 302 receives the electrical signal sent by the first converter 301, performs parsing processing on the electrical signal, obtains the first data frame and/or the routing information of the third data frame, and obtains the second data frame and the routing information of the second data frame.

In this embodiment of the present invention, the obtained routing information of the third data frame is used to generate the third optical label, and the routing information of the third data frame may include a destination port address and length information. Optionally, the parser 302 may further buffer the data frame and the routing information of the data frame that are obtained by means of parsing. Under the control of the scheduler 311, the parser 302 may respectively send the routing information of the data frame and the data frame to the first generator 303 and the second generator 304, to trigger the first generator 303 to generate the third optical label and/or trigger the second generator 304 to generate the first optical packet payload, and trigger the first generator 303 to generate the second optical label and trigger the second generator 304 to generate the second optical packet payload.

For example, a Medium/Media Access Control (MAC) frame is obtained after an Ethernet data packet is parsed, and routing information of the MAC frame is obtained from the MAC frame, where the routing information of the MAC frame includes a destination MAC address and length information.

The first generator 303 is configured to generate the third optical label according to the routing information that is of the third data frame and obtained by the parser 302, and/or the second generator 304 is configured to generate the first optical packet payload according to the first data frame obtained by the parser 302; and the first generator 303 is further configured to generate the second optical label according to the routing information that is of the second data frame and obtained by the parser.

Figure 4:
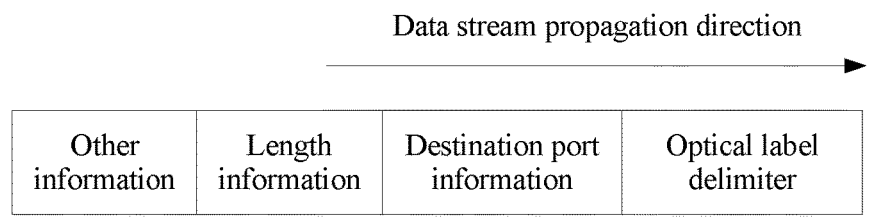
FIG. 4 is a schematic diagram of an optical label format according to an embodiment of the present invention.

Specifically, the routing information of the data frame is used by a controller of the optical switching device to generate control information to control an optical switch matrix of the optical switching device to set up an optical link. The first generator 303 receives the routing information that is of the third data frame and sent by the parser 302, and generates the third optical label according to the routing information of the third data frame and a preset optical label format. Referring to FIG. 4, FIG. 4 is a schematic diagram of an optical label format according to an embodiment of the present invention. As shown in the figure, the generated third optical label may include an optical label delimiter, destination port information, and length information, and may further include other information. The first generator 303 may generate the destination port information shown in FIG. 4 according to the received destination port address, and generate the length information shown in FIG. 4 according to the received length information. The optical label delimiter is used to indicate a start location of the third optical label; the destination port information is used to indicate a destination port of the third optical packet payload corresponding to the third optical label; and the length information is used to indicate a length of the third optical packet payload corresponding to the third optical label. The optical switching device may complete a switch scheduling operation of the third optical packet payload according to the destination port information. Generally, a length of the third optical label is fixed, and in this embodiment of the present invention, it is assumed that a transmission time of the third optical label is t -label. Optionally, the first generator 303 may further buffer the generated third optical label. In this case, under the control of the scheduler 311, the third optical label may be sent by the first generator 303 to the sub-exporter 312, and then is sent by the sub-exporter 312 to the second converter 313; or under the control of the scheduler 311, the third optical label may be directly sent by the first generator 303 to the second converter 313.

The second generator 304 is configured to generate the first optical packet payload according to the first data frame obtained by the parser, and is further configured to generate the second optical packet payload according to the second data frame obtained by the parser.

Figure 5:
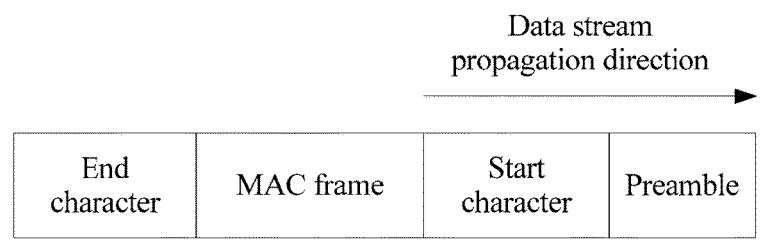
FIG. 5 is a schematic diagram of an optical packet payload format according to an embodiment of the present invention.

Specifically, the second generator 304 receives the first data frame sent by the parser 302 and generates the first optical packet payload according to the first data frame and a preset optical packet payload format. Referring to FIG. 5, FIG. 5 is a schematic diagram of an optical packet payload format according to an embodiment of the present invention. As shown in the figure, the generated first optical packet payload may include an end character, the data frame, a start character, and a preamble. For example, the second generator 304 uses the received data frame as the MAC frame shown in FIG. 5, and adds the start character, the end character, and the preamble. The end character is used to indicate a start location of the data frame; the start character is used to indicate an end location of the data frame; and the preamble is used by a receiving device to perform clock synchronization processing according to the preamble to receive the data frame accurately. It should be noted that, when the first optical packet payload is received by the optical packet receiving device, the receiving device needs to perform clock synchronization according to the preamble and prepare to receive an actual data frame. Optical packet payloads obtained after switching are from different optical packet signal sources and pass through different switched paths, so that the received optical packet payloads are different in signal amplitude and phase. In addition, clocks of different optical packet signal sources are different. Therefore, the receiving device needs to perform clock phase locking and decision threshold recovery for each optical packet payload. Before the locking and the recovery, data cannot be received accurately, that is, both the locking and the recovery need a specific overhead. The preamble is used as the overhead, and a gain of an amplifier in the receiving device and the clock phase locking are adjusted according to the preamble, which avoids sacrificing valid data in the optical packet payload before the locking and the recovery. Optionally, the second generator 304 may further perform scrambling processing on the generated first optical packet payload, so as to ensure stability and accuracy of the first optical packet payload in a transmission process.

Preferably, the exporter 31 further includes a scheduler 311, a sub-exporter 312, and a second converter 313, and the exporter 31 is specifically configured to:

The scheduler 311 is configured to monitor the first generator 303 and obtain a generation status of the third optical label, and/or is configured to monitor the second generator 304 and obtain a generation status of the first optical packet payload, where the generation status includes a generated state or a non-generated state.

The scheduler 311 is further configured to determine, after the second optical label is sent, a first sending moment of the first optical packet payload and/or a third sending moment of the third optical label within the guard time according to the generation status of the first optical packet payload and/or a generation status of the first optical label.

The scheduler 311 is further configured to enable a preset timer after the second optical label is sent, where the timer starts timing.

The scheduler 311 is further configured to generate a first control instruction when the timer reaches the first sending moment, and/or is further configured to generate a third control instruction when the timer reaches the third sending moment.

Specifically, the scheduler 311 enables the preset timer after the second optical label is sent, so that the timer starts timing. When the timer reaches preset first duration, it is determined that the timer reaches the first sending moment of the first optical packet payload, the first control instruction of the first optical packet payload is generated, and the first control instruction is sent to the sub-exporter 312, so that the sub-exporter 312 outputs the first optical packet payload to the second converter 313. When the timer reaches preset second duration, it is determined that the timer reaches the third sending moment of the third optical label.

If the third optical label is generated, the third control instruction of the third optical label is generated, and the third control instruction is sent to the sub-exporter 312, so that the sub-exporter 312 outputs the third optical label to the second converter 313. However, if the third optical label is not generated, a second control instruction of the second optical packet payload is generated, and the second control instruction is sent to the sub-exporter 312, so that the sub-exporter 312 outputs the second optical packet payload to the second converter 313. After the third optical label is generated, the third control instruction of the third optical label is generated, and the third control instruction is sent to the sub-exporter 312, so that the sub-exporter 312 outputs the third optical label to the second converter 313. In this way, the scheduler 311 can perform scheduling within the guard time between the moment for sending the second optical label and the moment for sending the corresponding second optical packet payload, so that the sub-exporter 312 outputs the third optical label and/or the first optical packet payload in a specific time sequence.

The sub-exporter 312 is configured to send the first optical packet payload to the second converter 313 according to the first control instruction generated by the scheduler 311, and/or is configured to send the third optical label to the second converter 313 according to the third control instruction generated by the scheduler 311.

Specifically, the sub-exporter 312 may multiplex, by means of time division multiplexing, the third optical label and the first optical packet payload on one transmission link for sending. The sub-exporter 312 is separately connected to the first generator 303 and the second generator 304. The first optical label provided by the first generator 303 may be selected to send to the second converter 313, or the first optical packet payload provided by the second generator 304 may be selected to send to the second converter 313. After receiving a control instruction of the scheduler 311, the sub-exporter 312 selects to send the third optical label or the first optical packet payload to the second converter 313 according to the control instruction.

The second converter 313 is configured to perform electrical-to-optical conversion processing on the third optical label and/or the first optical packet payload that are/is sent by the sub-exporter 312 to obtain a corresponding second optical signal and send the second optical signal to the optical switching device.

Specifically, the second converter 313 receives the third optical label and/or the first optical packet payload that are/is sent by the exporter 312; performs electrical-to-optical conversion processing on the third optical label and/or the first optical packet payload, so as to convert the third optical label and/or the first optical packet payload into a corresponding optical signal; and finally, sends the obtained optical signal to the optical switching device by using an optical medium between the second converter 313 and the optical switching device.

Alternatively, the exporter 31 further includes a scheduler 311 and a second converter 313, and the exporter 31 is specifically configured to:

The scheduler 311 is configured to monitor the first generator 303 and obtain a generation status of the third optical label, and/or is configured to monitor the second generator 304 and obtain a generation status of the first optical packet payload, where the generation status includes a generated state or a non-generated state.

The scheduler 311 is further configured to determine, after the second optical label is sent, a first sending moment of the first optical packet payload and/or a third sending moment of the third optical label within the guard time according to the generation status of the first optical packet payload and/or the generation status of the third optical label.

The scheduler 311 is further configured to enable a preset timer after the second optical label is sent, where the timer starts timing.

The scheduler 311 is further configured to generate a first control instruction when the timer reaches the first sending moment, and/or is further configured to generate a third control instruction when the timer reaches the third sending moment.

Specifically, the scheduler 311 enables the preset timer after the second optical label is sent, so that the timer starts timing. When the timer reaches preset first duration, it is determined that the timer reaches the first sending moment of the first optical packet payload, the first control instruction of the first optical packet payload is generated, and the first control instruction is sent to the second generator 304, so that the second generator 304 outputs the first optical packet payload to the second converter 313. When the timer reaches preset second duration, it is determined that the timer reaches the third sending moment of the third optical label; and if the third optical label is generated, the third control instruction of the third optical label is generated, and the third control instruction is sent to the first generator 303, so that the first generator 303 outputs the third optical label to the second converter 313. However, if the third optical label is not generated, a second control instruction of the second optical packet payload is generated, and the second control instruction is sent to the second generator 304, so that the second generator 304 outputs the second optical packet payload to the second converter 313. After the third optical label is generated, the third control instruction of the third optical label is generated, and the third control instruction is sent to the first generator 303, so that the first generator 303 outputs the third optical label to the second converter 313. In this way, the scheduler 311 can perform scheduling within the guard time between the moment for sending the second optical label and the moment for sending the corresponding second optical packet payload, so that the first generator 303 and/or the second generator 304 output/outputs the third optical label and/or the first optical packet payload in a specific time sequence. It should be noted that, the first generator 303 is a component that is configured to generate all optical labels in the present invention and that is in the optical packet sending device. Likewise, the second generator 304 is a component that is configured to generate all optical packet payloads in the present invention and that is in the optical packet sending device. Therefore, the second optical label is generated by the first generator 303, and the second optical packet payload is generated by the second generator 304.

The first generator 303 is further configured to send the third optical label to the second converter 313 according to the third control instruction generated by the scheduler 311, and/or the second generator 304 is further configured to send the first optical packet payload to the second converter 313 according to the first control instruction generated by the scheduler 311.

Specifically, the first generator 303 and the second generator 304 are separately connected to the second converter 313. After buffering the third optical label, the first generator 303 sends the buffered third optical label to the second converter 313 if the first generator 303 receives the third control instruction sent by the scheduler 311. Likewise, after buffering the first optical packet payload, the second generator 304 sends the buffered first optical packet payload to the second converter 313 if the second generator 304 receives the first control instruction sent by the scheduler 311.

The second converter 313 is further configured to perform electrical-to-optical conversion processing on the third optical label that is sent by the first generator 303 and/or the first optical packet payload that is sent by the second generator 304 to obtain a corresponding second optical signal and send the second optical signal to the optical switching device.

Specifically, the second converter 313 receives the third optical label that is sent by the first generator 303, and/or receives the first optical packet payload that is sent by the second generator 304; the second converter 313 performs electrical-to-optical conversion processing on the third optical label and/or the first optical packet payload, so as to convert the third optical label and/or the first optical packet payload into a corresponding optical signal; and the second converter 313 sends the obtained optical signal to the optical switching device by using the optical medium between the second converter 313 and the optical switching device.

It should be noted that, the foregoing first converter 301 and the second converter 313 may be implemented by using a transceiver (Transceiver). The parser 302, the first generator 303, the second generator 304, the scheduler 311, and the sub-exporter 312 may be implemented by separately using a field programmable gate array (FPGA) chip or an application-specific integrated circuit (ASIC). A different program on the chip or the ASIC may make the chip or the integrated circuit have a different function.

Figure 6:
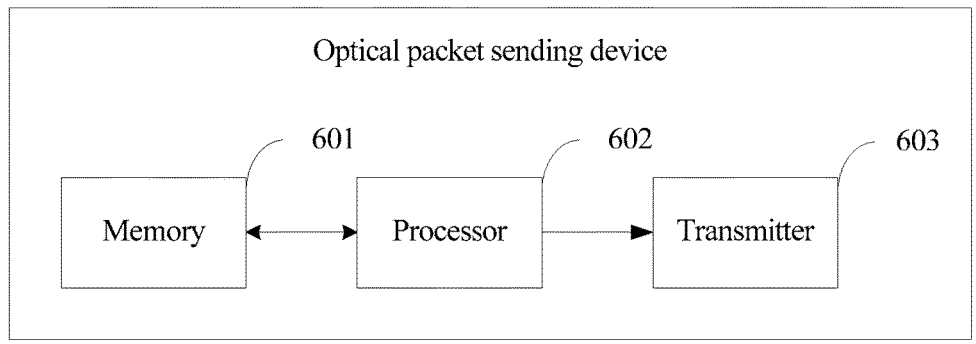
FIG. 6 is a functional block diagram of an optical packet sending device according to an embodiment of the present invention.

Referring to FIG. 6, FIG. 6 is a schematic structural diagram of an optical packet sending device according to an embodiment of the present invention. As shown in the figure, the optical packet sending device includes:

a memory 601, configured to store information including a program routine;

a processor 602, coupled to the memory 601 and a transmitter 603, configured to control execution of the program routine, which specifically includes: obtaining a first optical packet payload and/or a third optical label, and obtaining a second optical label and a second optical packet payload corresponding to the second optical label; and the transmitter 603, configured to send, within a guard time between a moment for sending the second optical label and a moment for sending the second optical packet payload, the third optical label and/or the first optical packet payload that are/is obtained by the processor 602 to an optical switching device, so that the optical switching device performs, according to the third optical label, switch processing on a third optical packet payload corresponding to the third optical label, and/or the optical switching device performs switch processing on the first optical packet payload according to a first optical label corresponding to the first optical packet payload.

The second optical label is sent first and the second optical packet payload is sent later; the first optical packet payload is an optical packet payload corresponding to the first optical label that has been sent before the second optical label is sent; and the third optical label is an optical label corresponding to the third optical packet payload following the second optical packet payload.

Figure 7:
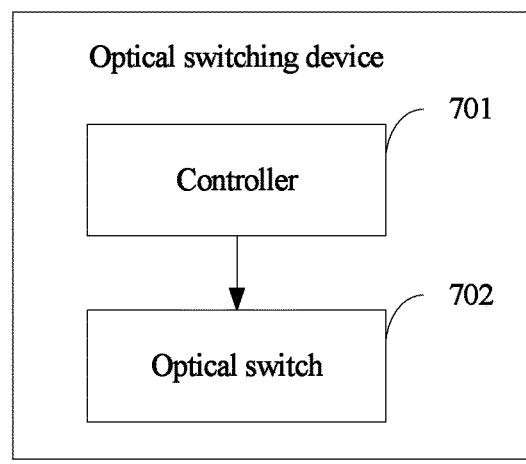
FIG. 7 is a functional block diagram of an optical switching device according to an embodiment of the present invention.

Referring to FIG. 7, FIG. 7 is a functional block diagram of an optical switching device according to an embodiment of the present invention. As shown in the figure, the optical switching device includes:

a controller 701, configured to receive a third optical label and/or a first optical packet payload that are/is sent by an optical packet sending device within a guard time between a moment for sending a second optical label and a moment for sending a corresponding second optical packet payload, where the second optical label is sent first and the second optical packet payload is sent later; the first optical packet payload is an optical packet payload corresponding to a first optical label that has been sent before the second optical label is sent; and the third optical label is an optical label corresponding to a third optical packet payload following the second optical packet payload; where the controller 701 obtains corresponding third control information according to the third optical label, where the third control information is used by an optical switch matrix 702 to perform, according to the third control information obtained by the controller 701, switch processing on the third optical packet payload corresponding to the third optical label; and/or the optical switch matrix 702 is configured to perform switch processing on the first optical packet payload according to first control information, where the first control information is obtained by the controller according to the first optical label.

Preferably, the controller 701 is specifically configured to obtain the corresponding third control information according to the third optical label, and send the third control information to the optical switch matrix according to preset first duration; and the optical switch matrix 702 is specifically configured to: according to the third control information sent by the controller, set up an optical link for transmitting the third optical packet payload; and after the third optical packet payload is obtained, perform, by using the optical link, switch processing on the third optical packet payload corresponding to the third optical label.

Preferably, that the controller 701 sends the third control information to the optical switch matrix 702 according to the preset first duration specifically includes: enabling a timer after the third control information is obtained, where the timer starts timing, and sending the third control information to the optical switch matrix 702 when the timer reaches the first duration.

Specifically, after an optical packet enters the optical switching device, the optical packet is first processed by an optical splitter. The third optical label in the optical packet is extracted by the optical splitter, and then is provided to the controller 701. Therefore, the controller 701 can receive the third optical label sent by the optical packet sending device, extract destination port information and length information from the third optical label, and perform path computation according to the destination port information to obtain the corresponding third control information. For example, the controller 701 may perform conflict detection according to the destination port information, and compute, according to a detection result, the optical link for transmitting the third optical packet payload corresponding to the third optical label.

After obtaining the first control information, the controller 701 enables the timer, so that the timer starts timing; when the timer reaches the preset first duration, the controller 701 sends the first control information to the optical switch matrix 702. Therefore, the optical switch matrix 702 can set up, according to the first control information, an optical link between a source port and a destination port that are of the first optical packet payload. Optionally, after the optical switch matrix 702 sets up the optical link, the controller 701 may further control the optical switch matrix 702 according to the foregoing length information, so that the optical switch matrix 702 can maintain the optical link according to the control of the controller 701, that is, determine a period of time for which the optical link needs to be maintained after the optical link is set up. In addition, other information in the third optical label may be used by the controller 701 to perform conflict detection.

Preferably, the third optical label includes the length information, and that the controller 701 sends the third control information to the optical switch matrix according to the preset first duration specifically includes: comparing length information included in a previous optical label of the third optical label with a preset length threshold; and if the length information is less than or equal to the length threshold, sending the third control information to the optical switch matrix 702; or if the length information is greater than the length threshold, enabling the timer after the third control information is obtained, so that the timer starts timing; and when the timer reaches preset first duration, sending the third control information to the optical switch matrix 702.

Specifically, after receiving the third optical label, the controller 701 compares the length information included in the previous optical label with the preset length threshold; and if the length information is less than or equal to the length threshold, immediately sends the third control information to the optical switch matrix 702; or if the length information is greater than the length threshold, enables the timer after the third control information is obtained, so that the timer starts timing; and when the timer reaches the preset second duration, sends the third control information to the optical switch matrix 702, so that the optical switch matrix 702 sets up, according to the third control information, the optical link that is between the source port and the destination port and that is used to transmit the third optical packet payload.

After transmitted by using the optical link, the first optical packet payload enters an optical packet receiving device. The optical packet receiving device performs burst receiving, data frame restoration, data frame sending, and other processing on the first optical packet payload. The burst receiving processing means converting the received first optical packet payload into an electrical signal, obtaining a data frame in the first optical packet payload according to a start character and an end character that are in the first optical packet payload, converting the data frame into a data format that can be identified by a destination device, and sending the data frame to the destination device; for example, the destination device may be an Ethernet device.

Figure 8:
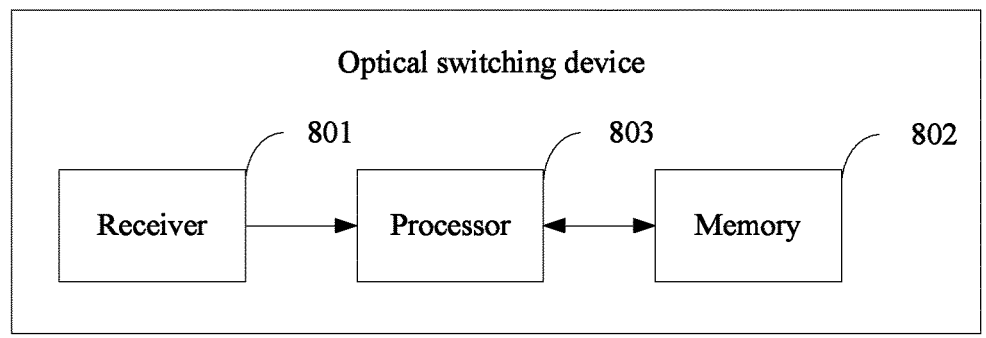
FIG. 8 is a schematic structural diagram of an optical switching device according to an embodiment of the present invention.

Referring to FIG. 8, FIG. 8 is a schematic structural diagram of an optical switching device according to an embodiment of the present invention. As shown in the figure, the optical switching device includes:

a receiver 801, configured to receive a third optical label and/or a first optical packet payload that are/is sent by an optical packet sending device within a guard time between a moment for sending a second optical label and a moment for sending a corresponding second optical packet payload, where the second optical label is sent first and the second optical packet payload is sent later, the first optical packet payload is an optical packet payload corresponding to a first optical label that has been sent before the second optical label is sent, and the third optical label is an optical label corresponding to a third optical packet payload following the second optical packet payload;

a memory 802, configured to store information including a program routine; and a processor 803, separately coupled to the memory 802 and the receiver 801, configured to control execution of the program routine, and specifically including: obtaining corresponding third control information according to the third optical label; performing, according to the third control information, switch processing on the third optical packet payload corresponding to the third optical label; and/or performing switch processing on the first optical packet payload according to first control information, where the first control information is obtained by the controller according to the first optical label.

Embodiments of the present invention further provide method embodiments that implement the units in the foregoing device embodiments.

Figure 9:
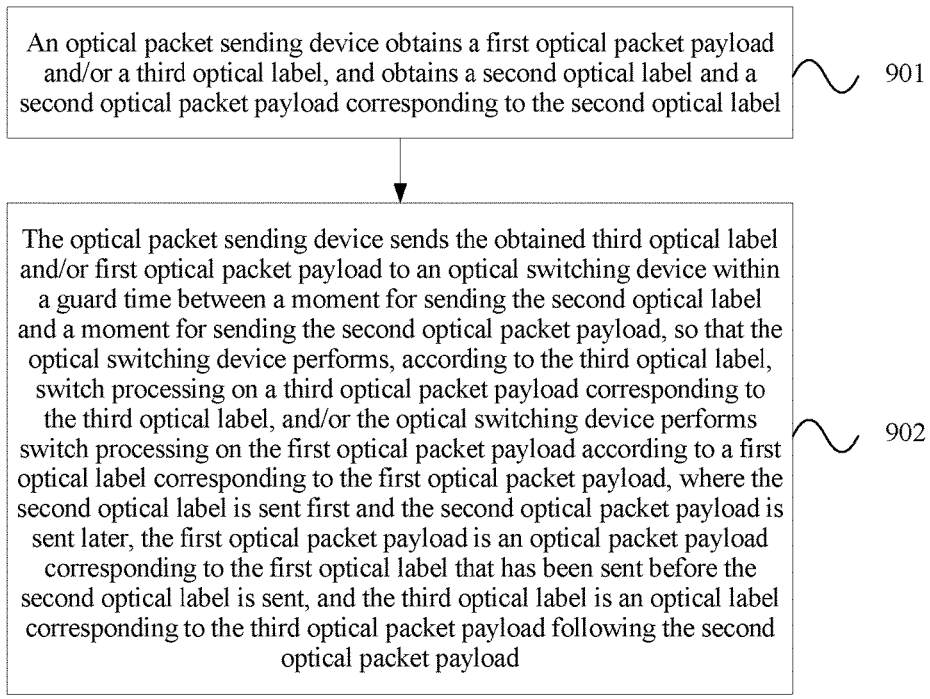
FIG. 9 is a schematic flowchart of an optical packet sending method according to an embodiment of the present invention.

An embodiment of the present invention provides an optical packet sending method. Referring to FIG. 9, FIG. 9 is a schematic flowchart of an optical packet sending method according to an embodiment of the present invention. As shown in FIG. 9, the method includes the following steps.

Step 901: An optical packet sending device obtains a first optical packet payload and/or a third optical label, and obtains a second optical label and a second optical packet payload corresponding to the second optical label.

Specifically, first, the optical packet sending device receives a first optical signal by using an optical medium between the optical packet sending device and a user side device, and performs optical-to-electrical conversion processing on the first optical signal to obtain a corresponding electrical signal.

Then, the optical packet sending device performs parsing processing on the obtained electrical signal to obtain a first data frame and/or routing information of a third data frame and obtain a second data frame and routing information of the second data frame.

The routing information of the third data frame is used to generate the third optical label, and the first data frame is used to generate the first optical packet payload. The second data frame is used to generate the second optical packet payload, and the routing information of the second data frame is used to generate the second optical label. Preferably, the routing information of the data frame may include a destination port address and length information. Optionally, the optical packet sending device may further buffer the data frame and the routing information of the data frame that are obtained by means of parsing.

Next, the optical packet sending device generates the third optical label according to the obtained routing information of the third data frame, and/or the optical packet sending device generates the first optical packet payload according to the obtained first data frame.

The optical packet sending device generates the second optical label according to the obtained routing information of the second data frame, and the optical packet sending device generates the second optical packet payload according to the obtained second data frame.

For example, the third optical label is used by an optical switching device to generate third control information to control an optical switch matrix to set up an optical link. The optical packet sending device generates the third optical label according to the routing information of the third data frame and a preset optical label format. Referring to FIG. 4, FIG. 4 is a schematic diagram of an optical label format according to an embodiment of the present invention. As shown in the figure, the generated third optical label may include an optical label delimiter, destination port information, and length information, and may further include other information. The optical packet sending device obtains the destination port information shown in FIG. 4 according to the received destination port address, and obtains the length information shown in FIG. 4 according to the received length information. The optical label delimiter is used to indicate a start location of the third optical label; the destination port information is used to indicate a destination port of a third optical packet payload corresponding to the third optical label; and the length information is used to indicate length information of the third optical packet payload corresponding to the third optical label. The optical switching device may complete a switch scheduling operation of the third optical packet payload according to the destination port information. Generally, a length of the third optical label is fixed, and in this embodiment of the present invention, it is assumed that a transmission time of the third optical label is $t_{label}$. Optionally, the optical packet sending device may further buffer the generated third optical label.

Likewise, the optical packet sending device generates the first optical packet payload according to the data frame and a preset optical packet payload format. Referring to FIG. 5, FIG. 5 is a schematic diagram of an optical packet payload format according to an embodiment of the present invention. As shown in the figure, the generated first optical packet payload may include an end character, the data frame, a start character, and a preamble. The optical packet sending device uses the data frame as the data frame shown in FIG. 5, and sets the start character, the end character, and the preamble. The end character and the start character respectively indicate a start location and an end location that are of the data frame. When the first optical packet payload is received by an optical signal receiving device, the receiving device needs to perform clock synchronization according to the preamble and prepare to receive an actual data frame, for example, the clock is adjusted according to the preamble, so as to receive the data accurately. Optionally, the optical packet sending device may further perform scrambling processing on the generated first optical packet payload, so as to ensure stability and accuracy of the first optical packet payload in a transmission process.

Step 902: The optical packet sending device sends the obtained third optical label and/or first optical packet payload to an optical switching device within a guard time between a moment for sending the second optical label and a moment for sending the second optical packet payload, so that the optical switching device performs, according to the third optical label, switch processing on a third optical packet payload corresponding to the third optical label, and/or the optical switching device performs switch processing on the first optical packet payload according to a first optical label corresponding to the first optical packet payload, where the second optical label is sent first and the second optical packet payload is sent later, the first optical packet payload is an optical packet payload corresponding to the first optical label that has been sent before the second optical label is sent, and the third optical label is an optical label corresponding to the third optical packet payload following the second optical packet payload.

Specifically, first, the optical packet sending device monitors the first generator and obtains a generation status of the third optical label, and/or monitors the second generator and obtains a generation status of the first optical packet payload, where the generation status includes a generated state or a non-generated state.

Then, after sending the second optical label, the optical packet sending device determines a first sending moment of the first optical packet payload and/or a third sending moment of the third optical label within the guard time according to the generation status of the first optical packet payload and/or a generation status of the first optical label.

Finally, after the second optical label is sent, a preset timer is enabled, where the timer starts timing; when the timer reaches the first sending moment, electrical-to-optical conversion processing is performed on the first optical packet payload to obtain a corresponding second optical signal; and/or when the timer reaches the third sending moment, electrical-to-optical conversion processing is performed by the third optical label to obtain a corresponding second optical signal, and the second optical signal is sent to the optical switching device.

For example, after sending the second optical label, the optical packet sending device enables the preset timer, so that the timer starts timing. When the timer reaches preset first duration, it is determined that the first optical packet payload is to be sent, a control instruction of the first optical packet payload is generated, and the first optical packet payload is output to the optical switching device. When the timer reaches preset second duration and the third optical label is generated, a third control instruction of the third optical label is generated, and the third optical label is output to the optical switching device. However, if the third optical label is not generated, a second control instruction of the second optical packet payload is generated, and the second optical packet payload is output to the optical switching device. After the third optical label is generated, the third control instruction of the third optical label is generated, and the third optical label is output to the optical switching device. In this way, the optical packet sending device can perform scheduling within the guard time between the moment for sending the second optical label and the moment for sending the corresponding second optical packet payload, and output the third optical label and/or the first optical packet payload in a specific time sequence.

Preferably, the optical packet sending device may buffer the third optical label and/or the first optical packet payload; after a control instruction is generated, perform electrical-to-optical conversion processing on the buffered third optical label and/or first optical packet payload to obtain a corresponding second optical signal; and send the obtained optical signal to the optical switching device by using an optical medium between the optical packet sending device and the optical switching device.

Figure 10:
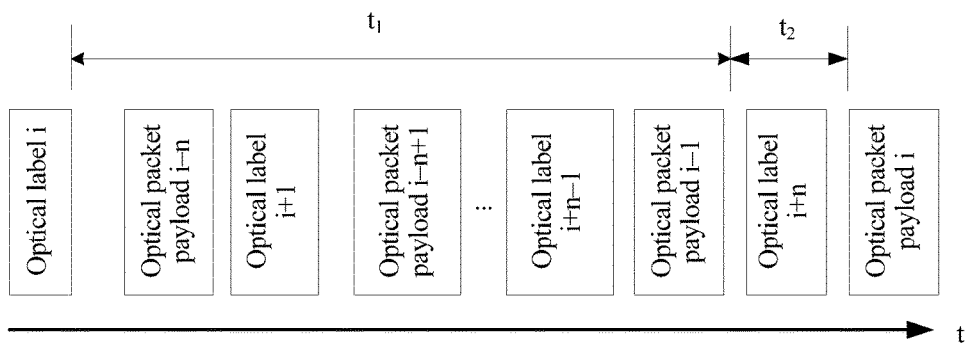
FIG. 10 is a schematic diagram of a sending time sequence of an optical label and an optical packet payload according to an embodiment of the present invention.

Referring to FIG. 10, FIG. 10 is a schematic diagram of a sending time sequence of an optical label and an optical packet payload according to an embodiment of the present invention. As shown in the figure, an optical packet sending device sends, by using the foregoing method, the optical label and the optical packet payload that are shown in FIG. 10 to an optical switching device. Within a guard time between a moment for sending an optical label i (equivalent to the foregoing second optical label) and a moment for sending an optical packet payload i (equivalent to the foregoing second optical packet payload), n optical labels (equivalent to the foregoing third optical label) and/or n optical packet payloads (equivalent to the foregoing first optical packet payload) are sent, where n is an integer greater than or equal to 1. As shown in FIG. 10, the guard time between the moment for sending the optical label i and the moment for sending the corresponding optical packet payload i is greater than or equal to a sum of duration that the optical switching device requires to generate a control signal according to the optical label i and duration that the optical switching device requires to set up an optical link according to the control signal. Therefore, the guard time is divided into $t_1$ and $t_2$. As shown in FIG. 10, the optical label i is sent before an optical packet payload i-n; therefore, the guard time between the moment for sending the optical label i and the moment for sending the optical packet payload i is not a period of idle time, within which n optical labels and/or n optical packet payloads are sent.

Preferably, $t_1$ needs to be greater than or equal to duration $t_{control}$ that the optical switching device requires to receive the optical label i and generate the control signal according to the optical label i, that is, $t_1 \geq t_{control}$. A value of n may be determined according to $t_{control}$, that is, n satisfies $$\left\lfloor \frac{t_{control}}{t_{p\_max}} \right\rfloor \geq n \geq 1,$$

where $t_{p\_max}$ is a longest transmission time of an optical packet payload. Therefore, $t_1$ needs to be greater than or equal to duration $t_{control}$ that the optical switching device requires to receive the optical label i and generate the control signal according to the optical label i, and further needs to satisfy that at least one another optical packet payload and/or at least one another optical label can be sent within a guard time between the moment for sending the optical label i and a moment for sending an optical packet payload i−1; and $t_2$ needs to be greater than or equal to duration $t_{switch}$ that the optical switching device requires to set up an optical link for transmitting an optical packet payload, and needs to be greater than or equal to transmission duration $t^{label}$ that one optical label requires.

It should be noted that, a value range of n may be determined according to $t_{control}$. When a control algorithm used by the optical switching device is relatively complex, a larger value of $t_{control}$ indicates that a value of n may be in a larger range. In this embodiment of the present invention, the value of n may be preset according to the value range of n, and is used as a preset parameter of the optical signal sending device.

Embodiment 1

Figure 11:
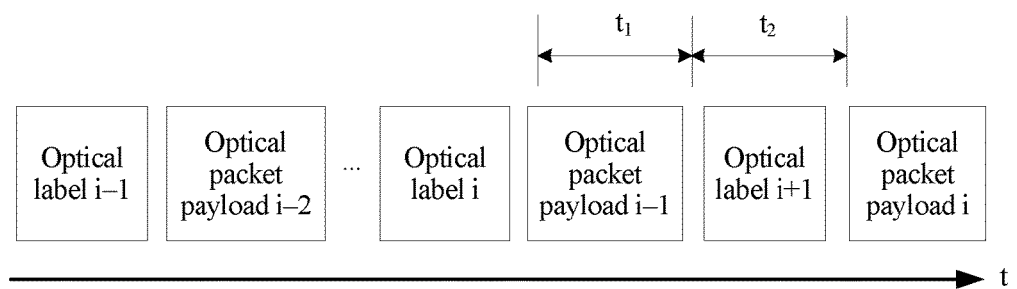
FIG. 11 is a first schematic diagram, of a sending time sequence of an optical label and an optical packet payload when n is equal to 1, according to an embodiment of the present invention.

Referring to FIG. 11, FIG. 11 is a first schematic diagram, of a sending time sequence of an optical label and an optical packet payload when n is equal to 1, according to an embodiment of the present invention. As shown in the figure, that n is equal to 1 is used as an example in this embodiment to describe a method in which an optical signal sending device sends an obtained third optical label and/or first optical packet payload to an optical switching device within a guard time between a moment for sending a second optical label and a moment for sending a second optical packet payload. In FIG. 11, an optical label i is equivalent to the foregoing second optical label, an optical packet payload i is equivalent to the foregoing second optical packet payload, an optical label i+1 is equivalent to the foregoing third optical label, an optical packet payload i−1 is equivalent to the foregoing first optical packet payload, the optical label i+1 is an optical label corresponding to an optical packet payload i+1 following the optical packet payload i, and an optical label i−1 corresponding to the optical packet payload i−1 is completely sent.

Figure 12:
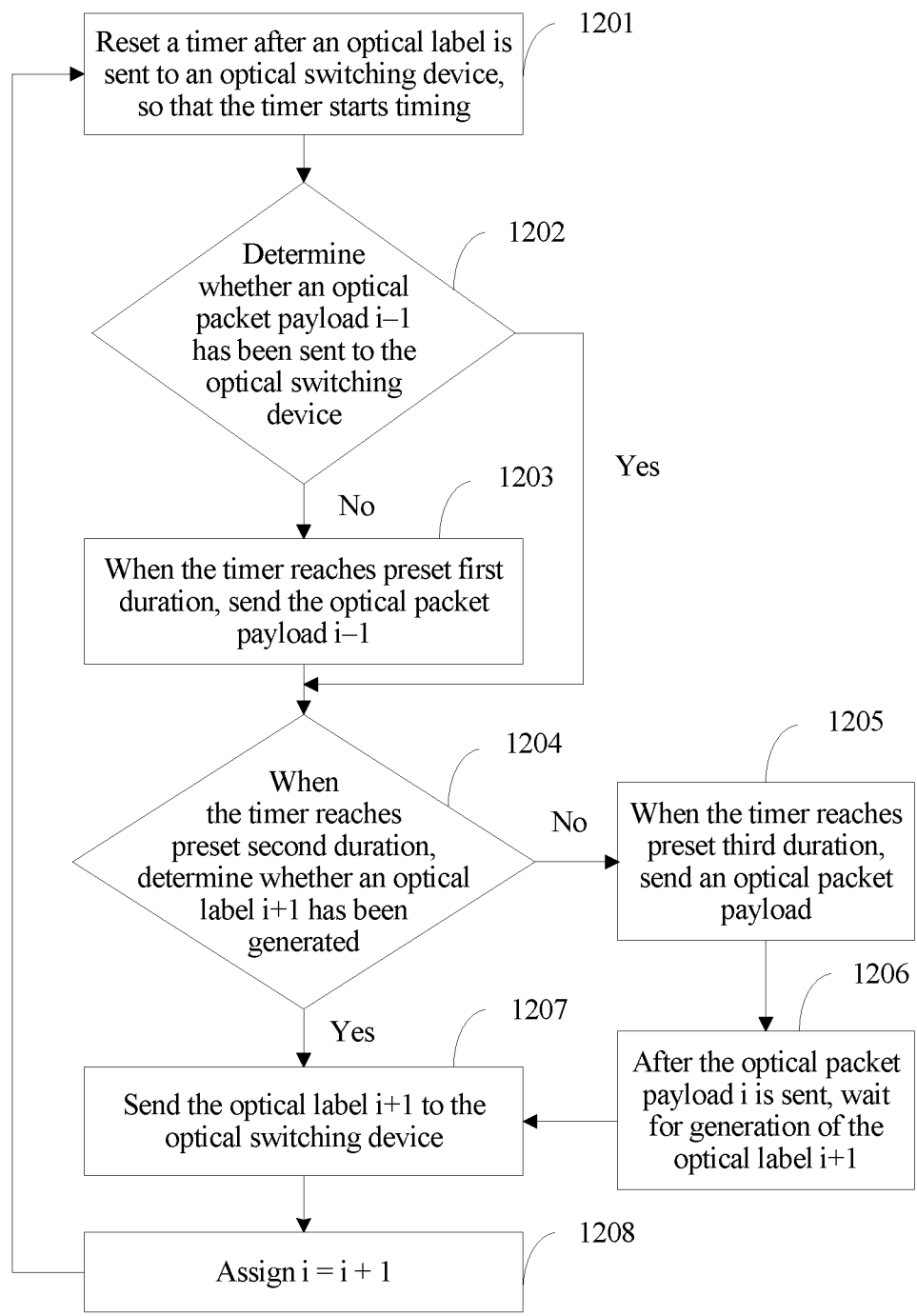
FIG. 12 is a schematic flowchart of Embodiment 1 of an optical packet sending method according to an embodiment of the present invention.

Referring to FIG. 12, FIG. 12 is a schematic flowchart of Embodiment 1 of an optical packet sending method according to an embodiment of the present invention. As shown in the figure, the method includes the following steps.

Step 1201: Reset a timer after the optical packet sending device sends the optical label i to the optical switching device, so that the timer starts timing.

Step 1202: The optical packet sending device determines whether the optical packet payload i−1 has been sent to the optical switching device; and if the optical packet payload i−1 has not been sent to the optical switching device, performs step 1203, or if the optical packet payload i−1 has been sent to the optical switching device, performs step 1204.

Step 1203: When the timer reaches preset first duration $T_1$, where $T_1 = t_{gap}$, the optical signal sending device sends the optical packet payload i−1 and performs step 1204, where the first duration $t_{gap}$ is a time interval between a moment for sending the optical label i and a moment for sending the optical packet payload i−1.

Step 1204: When the timer reaches preset second duration $T_2$, where $T_2 = t_1 + t_2 - t_{gap} - t_{label}$, the optical packet sending device determines whether the optical label i+1 has been generated; and if the optical label i+1 has not been generated, performs step 1205, or if the optical label i+1 has been generated, performs step 1207, where $t_1$ needs to be greater than or equal to duration $t_{control}$ that the optical switching device requires to receive the optical label i and generate a control signal according to the optical label i; $t_{label}$ is transmission duration that one optical label requires; and $t_2$ needs to be greater than or equal to duration $t_{switch}$ that the optical switching device requires to set up an optical link for transmitting an optical packet payload, and needs to be greater than or equal to the duration $t_{label}$ required for transmitting one optical label.

Step 1205: When the timer reaches preset third duration $T_3$, where $T_3 = t_1 + t_2$, the timer stops timing, and the optical packet sending device sends the optical packet payload i and performs step 1206.

Step 1206: After sending the optical packet payload i, the optical packet sending device waits for generation of the optical label i+1; and after the optical label i+1 is generated, performs step 1207.

Step 1207: The optical packet sending device sends the optical label i+1 to the optical switching device and performs step 1208.

Step 1208: The optical packet sending device assigns i=i +1 and performs step 1201.

For example, a method for obtaining values of $t_1$ and $t_2$ may include the following.

Figure 13:
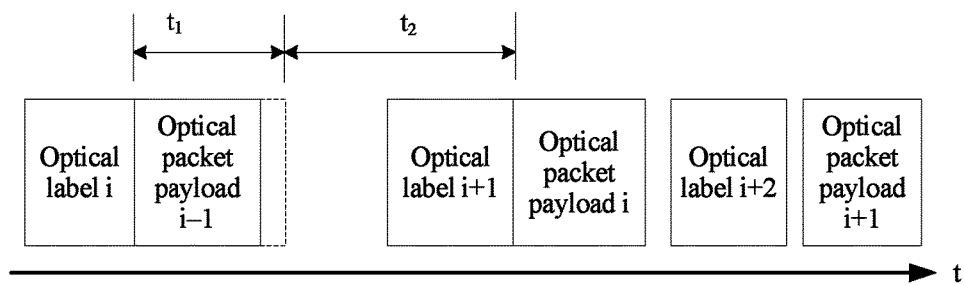
FIG. 13 is a second schematic diagram, of a sending time sequence of an optical label and an optical packet payload when n is equal to 1, according to an embodiment of the present invention.

When $t_{control} < t_{p\_max}$, $t_1 = t_{p\_max}$, and $t_{gap} = 0$ in this case. Referring to FIG. 13, FIG. 13 is a second schematic diagram, of a sending time sequence of an optical label and an optical packet payload when n is equal to 1, according to an embodiment of the present invention. In the sending time sequence shown in FIG. 13, $t_{gap} = 0$.

When $t_{control} \geq t_{p\_max}$, $t_1 = t_{control}$ and $0 < t_{gap} \leq t_{control} - t_{p\_max}$.
When $t_{label} + t_{gap} < t_{switch}$, $t_2 = t_{switch}$.
When $t_{label} + t_{gap} \geq t_{switch}$, $t_2 = t_{label} + t_{gap}$.

It should be noted that, as shown in FIG. 11 and FIG. 13, the optical label i is sent before the optical packet payload i−1; therefore, before an optical signal corresponding to the optical packet payload i enters the optical signal sending device and the corresponding optical label i is generated, the optical packet payload i−1 has been buffered, and the timer is set. When the timer expires, the optical label i has been generated. The optical packet payload i−1 is sent after the optical label i; otherwise, the buffered optical packet payload i−1 is sent to the optical switching device because the timer times out. Therefore, a sending time sequence of an optical label and an optical packet payload is related to rates at which the optical label and optical packet payload enter the optical packet sending device, that is, is related to load of the optical packet sending device. In this embodiment of the present invention, the load of the optical packet sending device has the following four cases.

Case 1: The optical packet sending device is in a continuous high-load state.

Figure 14:
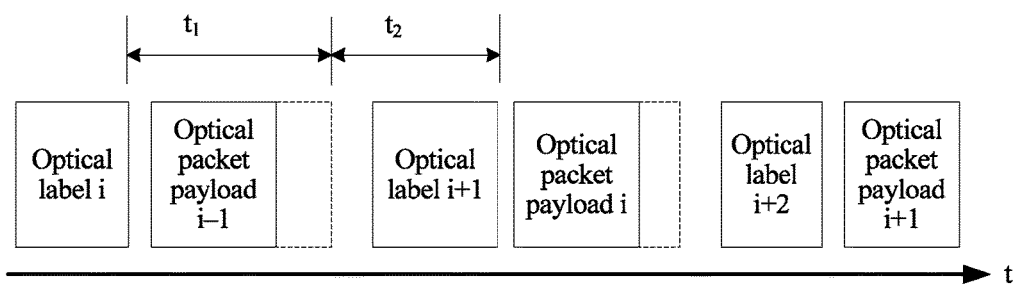
FIG. 14 is a third schematic diagram of a sending time sequence of an optical label and an optical packet payload according to an embodiment of the present invention.

Referring to FIG. 14, FIG. 14 is a third schematic diagram of a sending time sequence of an optical label and an optical packet payload according to an embodiment of the present invention. As shown in the figure, when the optical packet sending device is in the continuous high-load state, the optical label i+1 can be generated within duration $t_1+t_2-t_{gap}-t_{label}$ after the optical label i is sent, and therefore, the optical label i is always sent to the optical switching device before the optical packet payload i−1; and a corresponding performing procedure includes: step 1201→step 1202→step 1203→step 1204→step 1207→step 1208.

Case 2: The optical packet sending device changes from a high-load state to a low-load state.

Figure 15:
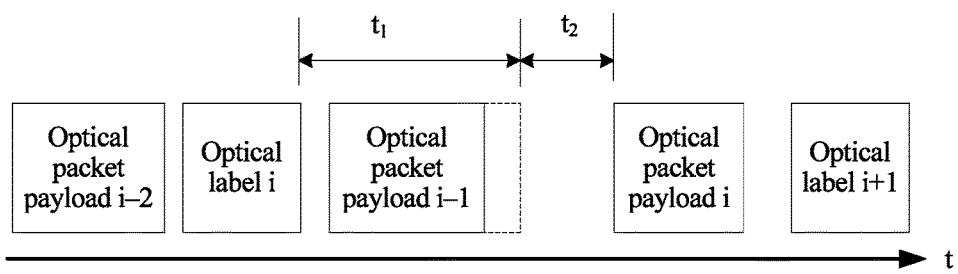
FIG. 15 is a fourth schematic diagram of a sending time sequence of an optical label and an optical packet payload according to an embodiment of the present invention.

Referring to FIG. 15, FIG. 15 is a fourth schematic diagram of a sending time sequence of an optical label and an optical packet payload according to an embodiment of the present invention. As shown in the figure, when the optical packet sending device changes from the high-load state to the low-load state, the optical label i is sent before the optical packet payload i−1, and the optical label i+1 is not generated within duration $t_1+t_2-t_{gap}-t_{label}$ after the optical label i is sent; and a corresponding performing procedure includes: step 1201→step 1202→step 1203→step 1204→step 1205→step 1206→step 1207→step 1208.

Case 3: The optical packet sending device is in a continuous low-load state.

Figure 16:
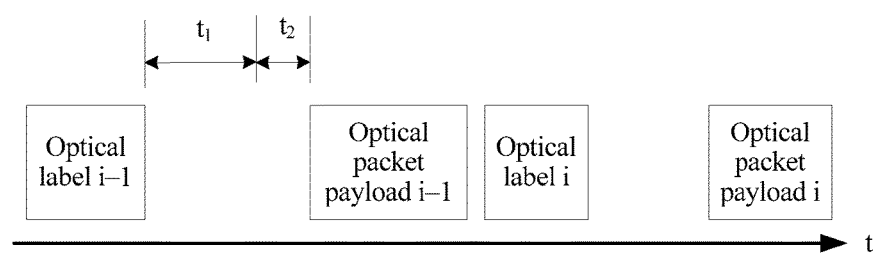
FIG. 16 is a fifth schematic diagram of a sending time sequence of an optical label and an optical packet payload according to an embodiment of the present invention.

Referring to FIG. 16, FIG. 16 is a fifth schematic diagram of a sending time sequence of an optical label and an optical packet payload according to an embodiment of the present invention. As shown in the figure, when the optical packet sending device is in the continuous low-load state, the optical label i+1 is still not generated within duration $t_1+t_2-t_{gap}-t_{label}$ after the optical label i is sent, and therefore, the optical packet payload i−1 has been sent to the optical switching device before the optical label i is generated; and a corresponding performing procedure includes: step 1201→step 1202→step 1204→step 1205→step 1206→step 1207→step 1208.

Case 4: The optical packet sending device changes from a low-load state to a high-load state.

Figure 17:
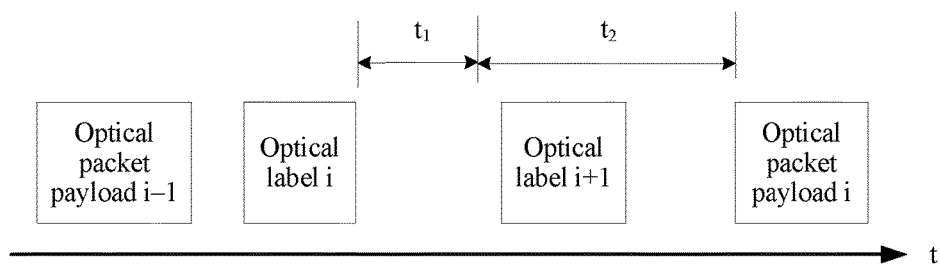
FIG. 17 is a sixth schematic diagram of a sending time sequence of an optical label and an optical packet payload according to an embodiment of the present invention.

Referring to FIG. 17, FIG. 17 is a sixth schematic diagram of a sending time sequence of an optical label and an optical packet payload according to an embodiment of the present invention. As shown in the figure, before the optical label i is generated, the optical packet payload i−1 has been sent to the optical switching device, and the optical label i+1 has been generated within duration $t_1+t_2-t_{gap}-t_{label}$ after the optical label i is sent; and a corresponding performing procedure includes: step 1201→step 1202→step 1204→step 1207→step 1208.

It can be learned from FIG. 14 to FIG. 17 that, within a guard time between a moment for sending an optical label and a moment for sending a corresponding optical packet payload, n optical labels and/or n optical packet payloads may be transmitted. In this embodiment, n=1; however, in practical application, a quantity n of optical labels transmitted within the guard time and a quantity n of optical packet payloads transmitted within the guard time are corresponding to an actual load state of the optical signal sending device.

As shown in FIG. 14, when the load of the optical packet sending device is relatively high, the optical packet sending device sends one complete optical packet payload i−1 and one complete optical label i+1 by making full use of the guard time between the moment for sending the optical label i and the moment for sending the corresponding optical packet payload i, so that a link resource within the guard time is not wasted. In this case, an actual quantity of optical labels or optical packet payloads between the optical label and the corresponding optical packet payload is equal to n. As shown in FIG. 15 to FIG. 17, when the optical packet sending device changes from high load to low load, the load of the optical packet sending device is relatively low, or the optical packet sending device changes from low load to high load, to avoid a problem that the optical packet payload i is buffered in the optical signal sending device for a relatively long time because an optical signal corresponding to the optical packet payload i+1 does not arrive at the optical signal sending device soon, which increases a time limit of the optical packet payload, within a specific period of time after the optical label i is sent, if the optical label i+1 is not generated, waiting for generation of the optical label i+1 ends. The optical packet sending device needs to send the optical packet payload i. In this case, within the guard time between the moment for sending the optical label and the moment for sending the corresponding optical packet payload i, a quantity of optical packet payloads or a quantity of optical labels is less than n.

Embodiment 2

In Embodiment 1, $t_1$ is equal to the larger one of $t_{control}$ and $t_{p\_max}$ that is $t_1=\max(t_{p\_max}, t_{control})$, where $t_1$ is fixed. That is when $t_{control}<t_{p\_max}$, regardless of a length of a current optical packet payload, a longest transmission time of the optical packet payload needs to be occupied, thereby wasting a specific link recourse, which is shown by a dashed line in FIG. 15. Therefore, in this embodiment, based on the case $t_{control}<t_{p\_max}$, a manner of dynamically adjusting $t_1$ is used to implement that an optical packet sending device sends the first optical label and/or the first optical packet payload to an optical switching device within a guard time between a moment for sending a second optical label and a moment for sending a corresponding second optical packet payload.

Figure 18:
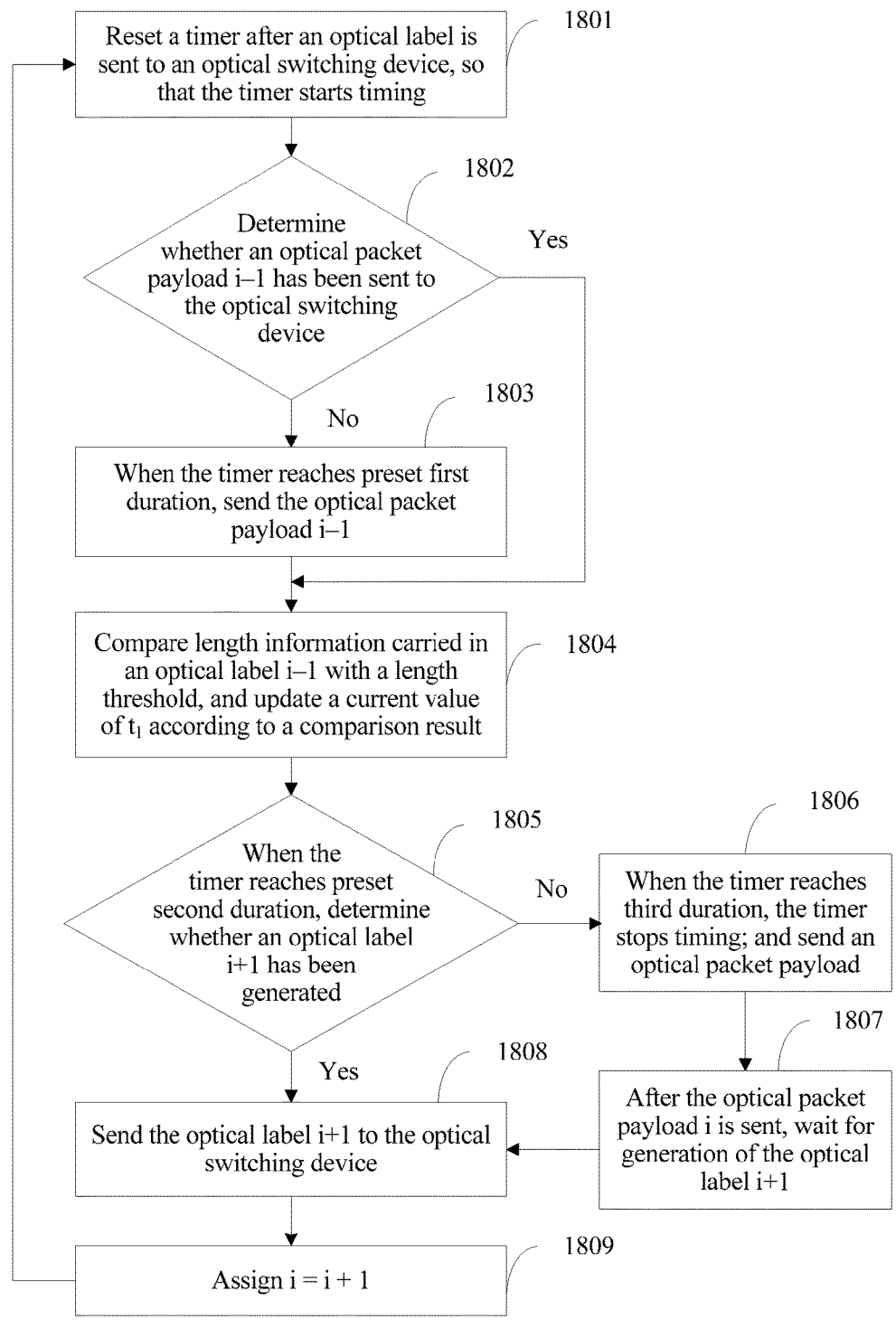
FIG. 18 is a schematic flowchart of Embodiment 2 of an optical packet sending method according to an embodiment of the present invention.

Referring to FIG. 18, FIG. 18 is a schematic flowchart of Embodiment 2 of an optical packet sending method according to an embodiment of the present invention. As shown in the figure, the method includes the following steps.

Step 1801: Reset a timer after an optical packet sending device sends an optical label i to an optical switching device, so that the timer starts timing.

Step 1802: The optical packet sending device determines whether an optical packet payload i−1 has been sent to the optical switching device; and if the optical packet payload i−1 has not been sent to the optical switching device, performs step 1803, or if the optical packet payload i−1 has been sent to the optical switching device, performs step 1804.

Step 1803: When the timer reaches preset first duration $T_1$, where $T_1=t_{gap}$, the optical signal sending device sends the optical packet payload i−1 and performs step 1804, where the first duration $t_{gap}$ is a time interval between a moment for sending the optical label i and a moment for sending the optical packet payload i−1.

Step 1804: The optical packet sending device compares length information $L_{i-1}$ carried in an optical label i−1 with a length threshold $L_{threshold}$; if $L_{threshold} \geq L_{i-1}$, $t_1=t_{control}$; or if $L_{threshold}<L_{i-1}$, $t_1=t_{Pi-1}$, where $t_{pi-1}$ indicates transmission duration of the optical packet payload i−1. According to a comparison result of the length information $L_{i-1}$ and the length threshold $L_{threshold}$, a current value of $t_1$ is updated, that is, the value of $t_1$ is dynamically adjusted in the optical packet sending device according to the length information of the optical packet payload, which can reduce a waste of a link resource and improve usage of the link resource.

For example, the optical packet sending device may convert a received optical signal to obtain an electrical signal, and then perform parsing processing on the electrical signal to obtain routing information of a data frame, where the routing information of the data frame includes the foregoing length information. Therefore, the optical packet sending device may obtain the length information $L_{i-1}$ included in the optical label i−1, where the length information $L_{i-1}$ refers to length information in the optical packet payload i−1 corresponding to the optical label i−1.

Step 1805: When the timer reaches preset second duration $T_2$, where $T_2=t_1+t_2-t_{gap}-t_{label}$, the optical packet sending device determines whether an optical label i+1 has been generated; and if the optical label i+1 has not been generated, performs step 1806, or if the optical label i+1 has been generated, performs step 1808.

Step 1806: When the timer reaches preset third duration $T_3$, where $T_3=t_1+t_2$, the timer stops timing, and the optical packet sending device sends an optical packet payload i and performs step 1807.

Step 1807: After sending the optical packet payload i, the optical packet sending device waits for generation of the optical label i+1; and after the optical label i+1 is generated, performs step 1808.

Step 1808: The optical packet sending device sends the optical label i+1 to the optical switching device and performs step 1809.

Step 1809: The optical packet sending device assigns i=i+1 and performs step 1801.

When a transmission time of the optical packet payload i−1 is less than a preset transmission time threshold $T_{threshold}$, a time interval between a moment for sending the optical label i and a moment for sending the corresponding optical packet payload i is $t_2+t_{control}$. When the transmission time of the optical packet payload i−1 is greater than or equal to the preset transmission time threshold $T_{threshold}$, the time interval between the moment for sending the optical label i and the moment for sending the corresponding optical packet payload i is $t_2+t_{Pi-1}$. Therefore, a small quantity of link resources are wasted only when the transmission time of the optical packet payload i−1 is less than the preset transmission time threshold $T_{threshold}$, thereby improving usage of the link resources.

Figure 19:
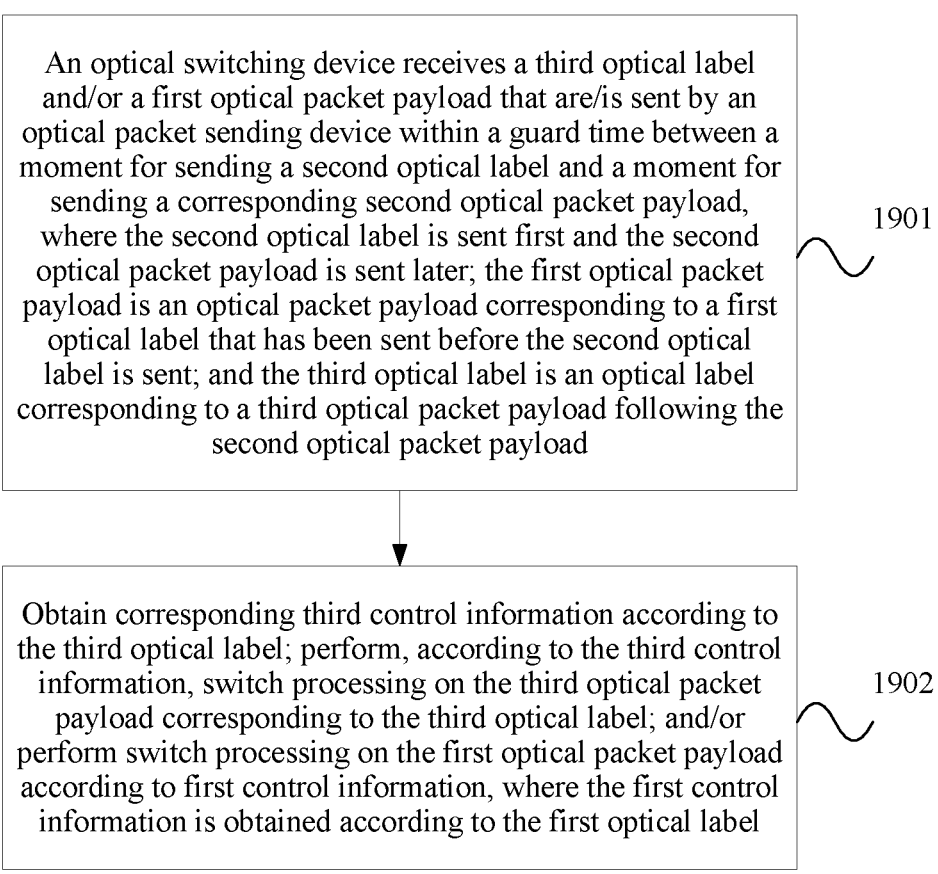
FIG. 19 is a schematic flowchart of an optical packet processing method according to an embodiment of the present invention.

This embodiment of the present invention provides an optical packet processing method. Referring to FIG. 19, FIG. 19 is a schematic flowchart of an optical packet processing method according to an embodiment of the present invention. As shown in FIG. 19, the method includes the following steps.

Step 1901: An optical switching device receives a third optical label and/or a first optical packet payload that are/is sent by an optical packet sending device within a guard time between a moment for sending a second optical label and a moment for sending a corresponding second optical packet payload, where the second optical label is sent first and the second optical packet payload is sent later; the first optical packet payload is an optical packet payload corresponding to a first optical label that has been sent before the second optical label is sent; and the third optical label is an optical label corresponding to a third optical packet payload following the second optical packet payload.

Step 1902: Obtain corresponding third control information according to the third optical label; perform, according to the third control information, switch processing on the third optical packet payload corresponding to the third optical label; and/or perform switch processing on the first optical packet payload according to first control information, where the first control information is obtained according to the first optical label.

Specifically, the optical switching device extracts destination port information and length information from the first optical label, and then performs path computation according to the destination port information to obtain the third control information. For example, conflict detection may be performed according to the destination port information, and an optical link for transmitting the third optical packet payload corresponding to the third optical label is computed according to a detection result.

In this embodiment of the present invention, the optical switching device sets up, according to preset first duration and the third control information, the optical link for transmitting the third optical packet payload, and performs, by using the optical link, switch processing on the third optical packet payload corresponding to the third optical label.

Preferably, the setting up, according to the preset first duration and the third control information, the optical link for transmitting the third optical packet payload may include the following two methods.

Method 1: After obtaining the third control information, the optical switching device enables a timer, so that the timer starts timing. When the timer reaches the preset first duration $T_1$, the optical link for transmitting the third optical packet payload is set up according to the third control information. Therefore, the optical switching device can set up an optical link between a source port and a destination port that are of the third optical packet payload according to the third control information. Herein, the first duration $T_1=t_1-t_{control}$.

Method 2: The optical switching device compares length information included in a previous optical label i−1 of the third optical label i with a preset length threshold $L_{threshold}$; and if the length information is less than or equal to the length threshold, sets up the optical link for transmitting the third optical packet payload i according to the third control information corresponding to the third optical label i, or if the length information included in the previous optical label i−1 is greater than the length threshold $L_{threshold}$, enables a timer after the third control information corresponding to the third optical label i is obtained, so that the timer starts timing; and when the timer reaches the preset first duration $T_1$, sets up the optical link for transmitting the third optical packet payload according to the third control information. Therefore, a previous optical packet payload i can be switched by using the optical link. Herein, the first duration $T_1=t_{Pi-1}-t_{control}$.

Optionally, the optical switching device may further maintain a status of the optical link according to the length information carried in the third optical label.

The technical solutions provided in the embodiments of the present invention specifically have the following technical effects:

1. Within a guard time between a moment for sending an optical label and a moment for sending a corresponding optical packet payload, another optical label and/or another optical packet payload can be transmitted; the another optical packet payload is an optical packet payload corresponding to another optical label that has been sent before the optical label is sent, and the another optical label is an optical label corresponding to another optical packet payload following the optical packet payload; and a corresponding optical link can be set up according to an optical label transmitted in advance, thereby reducing a waste of a link resource between an edge device and an optical switching device within the guard time and improving usage of the link resource.

2. Unlike a current technical solution of performing deferred processing on the optical packet payload by using a fiber delay line, the guard time can be obtained without the fiber delay line, which improves integration of the optical switching device, and satisfies a miniaturization requirement of the optical switching device.

3. When an algorithm running on the optical switching device is changed, the guard time between the moment for sending the optical label and the moment for sending the corresponding optical packet payload needs to be adjusted in an optical packet sending device. The optical packet sending device may dynamically adjust, according to the guard time, a quantity of optical labels and/or optical packet payloads that are sent within the guard time. Therefore, relatively high link usage can be always maintained, and a problem of link usage reduction due to increasing of the guard time will not be caused. In addition, the quantity of optical labels and/or optical packet payloads may be dynamically adjusted according to the guard time, so that the technical solutions of the embodiments of the present invention can be flexibly applied to various application scenarios and satisfy various requirements of the optical switching device.

The foregoing descriptions are merely exemplary embodiments of the present invention, but are not intended to limit the present invention. Any modification, equivalent replacement, or improvement made within the spirit and principle of the present invention should fall within the protection scope of the present invention.

What is claimed is:

1. An optical packet sending device, wherein the device comprises:
   a processor, configured to obtain a third optical label, and obtain a second optical label and a second optical packet payload corresponding to the second optical label; and
   an exporter, configured to send to an optical switching device, within a guard time between a moment for sending the second optical label and a moment for sending the second optical packet payload, the third optical label that is obtained by the processor, to enable the optical switching device, to perform, according to the third optical label, switch processing on a third optical packet payload corresponding to the third optical label; wherein
   the second optical label is sent to the optical switching device first and the second optical packet payload is sent later; the third optical label is an optical label corresponding to the third optical packet payload sent to the optical switching device following the second optical packet payload;
   or
   a processor, configured to obtain a first optical packet payload, and obtain a second optical label and a second optical packet payload corresponding to the second optical label; and
   an exporter, configured to send to an optical switching device, within a guard time between a moment for sending the second optical label and a moment for sending the second optical packet payload, the first optical packet payload that is obtained by the processor, to enable the optical switching device to perform switch processing on the first optical packet payload according to a first optical label corresponding to the first optical packet payload; wherein
   the second optical label is sent to the optical switching device first and the second optical packet payload is sent later; the first optical packet payload is an optical packet payload corresponding to the first optical label that has been sent to the optical switching device before the second optical label is sent to the optical switching device;
   or
   a processor, configured to obtain a first optical packet payload and a third optical label, and obtain a second optical label and a second optical packet payload corresponding to the second optical label; and
   an exporter, configured to send to an optical switching device, within a guard time between a moment for sending the second optical label and a moment for sending the second optical packet payload, the third optical label and/or the first optical packet payload that are/is obtained by the processor, to enable the optical switching device, to perform, according to the third optical label, switch processing on a third optical packet payload corresponding to the third optical label, and, to perform switch processing on the first optical packet payload according to a first optical label corresponding to the first optical packet payload; wherein
   the second optical label is sent to the optical switching device first and the second optical packet payload is sent later; the first optical packet payload is an optical packet payload corresponding to the first optical label that has been sent to the optical switching device before the second optical label is sent to the optical switching device; and the third optical label is an optical label corresponding to the third optical packet payload sent to the optical switching device following the second optical packet payload.

2. The device according to claim 1, wherein a processor is configured to obtain a third optical label, the processor comprises:
   a first converter, configured to receive an input first optical signal, and perform optical-to-electrical conversion processing on the first optical signal to obtain an electrical signal;
   a parser, configured to perform parsing processing on the electrical signal obtained by the first converter to obtain routing information of a third data frame and to obtain a second data frame and routing information of the second data frame;
   a first generator, configured to generate the third optical label according to the obtained routing information of the third data frame, and to generate the second optical label according to the obtained routing information of the second data frame; and
   a second generator, configured
   to generate the second optical packet payload according to the obtained second data frame obtained by the parser;
   or
   wherein a processor is configured to obtain a first optical packet payload, wherein the processor comprises:
   a first converter, configured to receive an input first optical signal, and perform optical-to-electrical conversion processing on the first optical signal to obtain an electrical signal;
   a parser, configured to perform parsing processing on the electrical signal obtained by the first converter to obtain a first data frame and to obtain a second data frame and routing information of the second data frame;

a first generator, configured to generate the second optical label according to the obtained routing information of the second data frame; and a second generator, configured to generate the first optical packet payload according to the obtained first data frame, and to generate the second optical packet payload according to the obtained second data frame obtained by the parser;

or wherein a processor is configured to obtain a first optical packet payload and a third optical label, wherein the processor comprises:

a first converter, configured to receive an input first optical signal, and perform optical-to-electrical conversion processing on the first optical signal to obtain an electrical signal;

a parser, configured to perform parsing processing on the electrical signal obtained by the first converter to obtain a first data frame and routing information of a third data frame and to obtain a second data frame and routing information of the second data frame;

a first generator, configured to generate the third optical label according to the obtained routing information of the third data frame, and to generate the second optical label according to the obtained routing information of the second data frame; and a second generator, configured to generate the first optical packet payload according to the obtained first data frame, and to generate the second optical packet payload according to the obtained second data frame obtained by the parser.

3. The device according to claim 1, wherein a processor is configured to obtain a third optical label, the exporter comprises a scheduler, a sub-exporter, and a second converter, wherein the scheduler is configured to monitor the first generator and obtain a generation status of the third optical label, wherein the generation status comprises a generated state or a non-generated state;

the scheduler is further configured to determine, after the second optical label is sent, a third sending moment of the third optical label within the guard time according to a generation status of the third optical label;

the scheduler is further configured to enable a preset timer after the second optical label is sent, wherein the timer starts timing;

the scheduler is further configured to generate a third control instruction when the timer reaches the third sending moment;

the sub-exporter is configured to send the third optical label to the second converter according to the third control instruction generated by the scheduler; and the second converter is configured to perform electrical-to-optical conversion processing on the third optical label sent by the sub-exporter, to obtain a corresponding second optical signal and to send the second optical signal to the optical switching device;

or wherein a processor is configured to obtain a first optical packet payload, the exporter comprises a scheduler, a sub-exporter, and a second converter, wherein the scheduler is configured to monitor the second generator and obtain a generation status of the first optical packet payload, wherein the generation status comprises a generated state or a non-generated state;

the scheduler is further configured to determine, after the second optical label is sent, a first sending moment of the first optical packet payload within the guard time according to the generation status of the first optical packet payload;

the scheduler is further configured to enable a preset timer after the second optical label is sent, wherein the timer starts timing;

the scheduler is further configured to generate a first control instruction when the timer reaches the first sending moment;

the sub-exporter is configured to send the first optical packet payload to the second converter according to the first control instruction generated by the scheduler; and the second converter is configured to perform electrical-to-optical conversion processing on the first optical packet payload sent by the sub-exporter, to obtain a corresponding second optical signal and to send the second optical signal to the optical switching device;

or wherein a processor is configured to obtain a first optical packet payload and a third optical label, the exporter comprises a scheduler, a sub-exporter, and a second converter, wherein the scheduler is configured to monitor the first generator and obtain a generation status of the third optical label, and monitor the second generator and obtain a generation status of the first optical packet payload, wherein the generation status comprises a generated state or a non-generated state;

the scheduler is further configured to determine, after the second optical label is sent, a first sending moment of the first optical packet payload and a third sending moment of the third optical label within the guard time according to the generation status of the first optical packet payload and a generation status of the third optical label;

the scheduler is further configured to enable a preset timer after the second optical label is sent, wherein the timer starts timing;

the scheduler is further configured to generate a first control instruction when the timer reaches the first sending moment, and generate a third control instruction when the timer reaches the third sending moment;

the sub-exporter is configured to send the first optical packet payload to the second converter according to the first control instruction generated by the scheduler, and send the third optical label to the second converter according to the third control instruction generated by the scheduler; and the second converter is configured to perform electrical-to-optical conversion processing on the third optical label and the first optical packet payload sent by the sub-exporter, to obtain a corresponding second optical signal and to send the second optical signal to the optical switching device.

4. The device according to claim 2, wherein a processor is configured to obtain a third optical label, the exporter comprises a scheduler and a second converter, wherein the scheduler is configured to monitor the first generator and obtain a generation status of the third optical label, wherein the generation status comprises a generated state or a non-generated state;

the scheduler is further configured to determine, after the second optical label is sent, a third sending moment of the third optical label within the guard time according to the generation status of the third optical label;

the scheduler is further configured to enable a preset timer after the second optical label is sent, wherein the timer starts timing;

the scheduler is further configured to generate a third control instruction when the timer reaches the third sending moment;

the first generator is further configured to send the third optical label to the second converter according to the third control instruction generated by the scheduler; and the second converter is further configured to perform electrical-to-optical conversion processing on the third optical label that is sent by the first generator, to obtain a corresponding second optical signal and to send the second optical signal to the optical switching device;

or wherein a processor is configured to obtain a first optical packet payload, the exporter comprises a scheduler and a second converter, wherein the scheduler is configured to monitor the second generator and obtain a generation status of the first optical packet payload, wherein the generation status comprises a generated state or a non-generated state;

the scheduler is further configured to determine, after the second optical label is sent, a first sending moment of the first optical packet payload within the guard time according to the generation status of the first optical packet payload;

the scheduler is further configured to enable a preset timer after the second optical label is sent, wherein the timer starts timing;

the scheduler is further configured to generate a first control instruction when the timer reaches the first sending moment;

the second generator is further configured to send the first optical packet payload to the second converter according to the first control instruction generated by the scheduler; and the second converter is further configured to perform electrical-to-optical conversion processing on the first optical packet payload sent by the second generator, to obtain a corresponding second optical signal and to send the second optical signal to the optical switching device;

or wherein a processor is configured to obtain a first optical packet payload and a third optical label, the exporter comprises a scheduler and a second converter, wherein the scheduler is configured to monitor the first generator and obtain a generation status of the third optical label, and monitor the second generator and obtain a generation status of the first optical packet payload, wherein the generation status comprises a generated state or a non-generated state;

the scheduler is further configured to determine, after the second optical label is sent, a first sending moment of the first optical packet payload and a third sending moment of the third optical label within the guard time according to the generation status of the first optical packet payload and the generation status of the third optical label;

the scheduler is further configured to enable a preset timer after the second optical label is sent, wherein the timer starts timing;

the scheduler is further configured to generate a first control instruction when the timer reaches the first sending moment, and generate a third control instruction when the timer reaches the third sending moment;

the first generator is further configured to send the third optical label to the second converter according to the third control instruction generated by the scheduler, and the second generator is further configured to send the first optical packet payload to the second converter according to the first control instruction generated by the scheduler; and the second converter is further configured to perform electrical-to-optical conversion processing on the third optical label that is sent by the first generator and the first optical packet payload sent by the second generator, to obtain a corresponding second optical signal and to send the second optical signal to the optical switching device.

5. The device according to claim 3, wherein the scheduler is configured to:

enable the preset timer after the second optical label is sent, so that the timer starts timing;

when the timer reaches preset first duration, determine that the timer reaches the first sending moment of the first optical packet payload, and generate the first control instruction of the first optical packet payload; and when the timer reaches preset second duration, determine that the timer reaches the third sending moment of the third optical label; and if the third optical label is generated, generate the third control instruction of the third optical label; or if the third optical label is not generated, generate a second control instruction of the second optical packet payload, and after the third optical label is generated, generate the third control instruction of the third optical label.

6. The device according to claim 2, wherein the first generator is configured to:

generate the first optical label according to the routing information of the data frame and a preset optical label format; wherein the first optical label comprises an optical label delimiter, destination port information, priority information, and length information, wherein the optical label delimiter is used to indicate a start location of the first optical label; the destination port information is used to indicate a destination port of the first optical packet payload corresponding to the first optical label; the priority information is used to indicate a priority of the first optical packet payload corresponding to the first optical label; and the length information is used to indicate a length of the first optical label.

7. The device according to claim 2, wherein the second generator is configured to:

generate the first optical packet payload according to the data frame and a preset optical packet payload format; wherein the first optical packet payload comprises an end character, the data frame, a start character, and a preamble, wherein the end character is used to indicate a start location of the data frame; the start character is used to indicate an end location of the data frame; and the preamble is used by a receiving device to perform clock synchronization processing according to the preamble to receive the data frame accurately.

8. An optical switching device, wherein the optical switching device comprises:

a controller, configured to receive a third optical label sent by an optical packet sending device within a guard time between a moment for sending a second optical label and a moment for sending a corresponding second optical packet payload, wherein the second optical label is sent by the optical packet sending device first and the second optical packet payload is sent by the optical packet sending device later; the third optical label is an optical label corresponding to a third optical packet payload by the optical packet sending device following the second optical packet payload; wherein the controller obtains corresponding third control information according to the third optical label, wherein the third control information is used by an optical switch matrix to perform, according to the obtained third control information, switch processing on the third optical packet payload corresponding to the third optical label;

or a controller, configured to receive a first optical packet payload sent by an optical packet sending device within a guard time between a moment for sending a second optical label and a moment for sending a corresponding second optical packet payload, wherein the second optical label is sent by the optical packet sending device first and the second optical packet payload is sent by the optical packet sending device later; the first optical packet payload is an optical packet payload corresponding to a first optical label that has been sent by the optical packet sending device before the second optical label is sent by the optical packet sending device; wherein an optical switch matrix is configured to perform switch processing on the first optical packet payload according to first control information, wherein the first control information is obtained by the controller according to the first optical label;

or a controller, configured to receive a third optical label and a first optical packet payload sent by an optical packet sending device within a guard time between a moment for sending a second optical label and a moment for sending a corresponding second optical packet payload, wherein the second optical label is sent by the optical packet sending device first and the second optical packet payload is sent by the optical packet sending device later; the first optical packet payload is an optical packet payload corresponding to a first optical label that has been sent by the optical packet sending device before the second optical label is sent by the optical packet sending device; and the third optical label is an optical label corresponding to a third optical packet payload by the optical packet sending device following the second optical packet payload; wherein the controller obtains corresponding third control information according to the third optical label, wherein the third control information is used by an optical switch matrix to perform, according to the obtained third control information, switch processing on the third optical packet payload corresponding to the third optical label; and the optical switch matrix is configured to perform switch processing on the first optical packet payload according to first control information, wherein the first control information is obtained by the controller according to the first optical label.

9. The optical switching device according to claim 8, wherein:

the controller is configured to obtain the corresponding third control information according to the third optical label, and send the third control information to the optical switch matrix according to preset first duration; and the optical switch matrix is configured to: according to the third control information sent by the controller, set up an optical link for transmitting the third optical packet payload; and after the third optical packet payload is obtained, perform, using the optical link, switch processing on the third optical packet payload corresponding to the third optical label.

10. The optical switching device according to claim 9, wherein:

that the controller sends the third control information to the optical switch matrix according to the preset first duration comprises: the controller is configured to enable a timer after the third control information is obtained, wherein the timer starts timing; and sending the third control information to the optical switch matrix when the timer reaches the first duration.

11. The optical switching device according to claim 9, wherein the third optical label comprises length information, and that the controller sends the third control information to the optical switch matrix according to the preset first duration comprises:

comparing length information comprised in a previous optical label of the third optical label with a preset length threshold; and if the length information is less than or equal to the length threshold, sending the third control information to the optical switch matrix; or if the length information is greater than the length threshold, enabling a timer after the third control information is obtained, wherein the timer starts timing; and when the timer reaches the first duration, sending the third control information to the optical switch matrix.

12. An optical packet sending method, wherein the method comprises:

obtaining a third optical label;

obtaining a second optical label and a second optical packet payload corresponding to the second optical label; and sending, within a guard time between a moment for sending the second optical label and a moment for sending the second optical packet payload, the obtained third optical label to an optical switching device, to enable the optical switching device to perform, according to the third optical label, switch processing on a third optical packet payload corresponding to the third optical label; wherein the second optical label is sent to the optical switching device first and the second optical packet payload is sent to the optical switching device later; and the third optical label is an optical label corresponding to the third optical packet payload sent to the optical switching device following the second optical packet payload;

or obtaining a first optical packet payload;

obtaining a second optical label and a second optical packet payload corresponding to the second optical label; and sending, within a guard time between a moment for sending the second optical label and a moment for sending the second optical packet payload, the obtained first optical packet payload to an optical switching device, to enable the optical switching device to perform, switch processing on the first optical packet payload according to a first optical label corresponding to the first optical packet payload; wherein the second optical label is sent to the optical switching device first and the second optical packet payload is sent to the optical switching device later; the first optical packet payload is an optical packet payload corresponding to the first optical label that has been sent to the optical switching device before the second optical label is sent to the optical switching device;

or obtaining a first optical packet payload and a third optical label;

obtaining a second optical label and a second optical packet payload corresponding to the second optical label; and sending, within a guard time between a moment for sending the second optical label and a moment for sending the second optical packet payload, the obtained at least one of the third optical label and first optical packet payload to an optical switching device, to enable the optical switching device to perform, according to the third optical label, switch processing on at least one of a third optical packet payload corresponding to the third optical label, and the first optical packet payload according to a first optical label corresponding to the first optical packet payload; wherein the second optical label is sent to the optical switching device first and the second optical packet payload is sent to the optical switching device later; the first optical packet payload is an optical packet payload corresponding to the first optical label that has been sent to the optical switching device before the second optical label is sent to the optical switching device; and the third optical label is an optical label corresponding to the third optical packet payload sent to the optical switching device following the second optical packet payload.

13. The method according to claim 12, wherein the sending, within a guard time between a moment for sending the second optical label and a moment for sending the second optical packet payload, the obtained third optical label to an optical switching device comprises:

monitoring a first generator and obtaining a generation status of the third optical label, wherein the generation status comprises a generated state or a non-generated state;

determining, after the second optical label is sent, a third sending moment of the third optical label within the guard time according to the generation status of the third optical label;

enabling a preset timer after the second optical label is sent, wherein the timer starts timing;

when the timer reaches the third sending moment, performing electrical-to-optical conversion processing on the third optical label to obtain a corresponding second optical signal; and sending the second optical signal to the optical switching device;

or wherein the sending, within a guard time between a moment for sending the second optical label and a moment for sending the second optical packet payload, the obtained first optical packet payload to an optical switching device comprises:

monitoring a second generator and obtaining a generation status of the first optical packet payload, wherein the generation status comprises a generated state or a non-generated state;

determining, after the second optical label is sent, a first sending moment of the first optical packet payload within the guard time according to the generation status of the first optical packet payload;

enabling a preset timer after the second optical label is sent, wherein the timer starts timing;

when the timer reaches the first sending moment, performing electrical-to-optical conversion processing on the first optical packet payload to obtain a corresponding second optical signal; and sending the second optical signal to the optical switching device;

or wherein the sending, within a guard time between a moment for sending the second optical label and a moment for sending the second optical packet payload, the obtained third optical label and the first optical packet payload to an optical switching device comprises:

monitoring a first generator and obtaining a generation status of the third optical label, and monitoring a second generator and obtaining a generation status of the first optical packet payload, wherein the generation status comprises a generated state or a non-generated state;

determining, after the second optical label is sent, a first sending moment of the first optical packet payload and a third sending moment of the third optical label within the guard time according to the generation status of the first optical packet payload and the first optical label;

enabling a preset timer after the second optical label is sent, wherein the timer starts timing;

when the timer reaches the first sending moment, performing electrical-to-optical conversion processing on the first optical packet payload to obtain a corresponding second optical signal; and when the timer reaches the third sending moment, performing electrical-to-optical conversion processing on the third optical label to obtain a corresponding second optical signal; and sending the second optical signal to the optical switching device.

14. The method according to claim 13, wherein the determining a third sending moment of the third optical label within the guard time according to a generation status of the third optical label comprises:

enabling the preset timer after the second optical label is sent, so that the timer starts timing;

when the timer reaches preset second duration, and the third optical label is generated, determining to send the third optical label; and when the third optical label is not generated, determining to send the second optical packet payload, and after the third optical label is generated, determining to send the third optical label;

or wherein the determining a first sending moment of the first optical packet payload within the guard time according to the generation status of the first optical packet payload comprises:

enabling the preset timer after the second optical label is sent, so that the timer starts timing;

when the timer reaches preset first duration, determining to send the first optical packet payload;

or wherein the determining a first sending moment of the first optical packet payload and a third sending moment of the third optical label within the guard time according to the generation status of the first optical packet payload and the generation status of the third optical label comprises;

enabling the preset timer after the second optical label is sent, so that the timer starts timing;

when the timer reaches preset first duration, determining to send the first optical packet payload; and when the timer reaches preset second duration, and the third optical label is generated, determining to send the third optical label; and when the third optical label is not generated, determining to send the second optical packet payload, and after the third optical label is generated, determining to send the third optical label.

15. An optical packet processing method, wherein the method comprises:

receiving a third optical label sent by an optical packet sending device within a guard time between a moment for sending a second optical label and a moment for sending a corresponding second optical packet payload, wherein the second optical label is sent first and the second optical packet payload is sent later; and the third optical label is an optical label corresponding to a third optical packet payload following the second optical packet payload; and obtaining corresponding third control information according to the third optical label;

performing, according to the third control information, switch processing on the third optical packet payload corresponding to the third optical label;

or receiving a first optical packet payload sent by an optical packet sending device within a guard time between a moment for sending a second optical label and a moment for sending a corresponding second optical packet payload, wherein the second optical label is sent first and the second optical packet payload is sent later; the first optical packet payload is an optical packet payload corresponding to a first optical label that has been sent before the second optical label is sent; and performing switch processing on the first optical packet payload according to first control information, wherein the first control information is obtained according to the first optical label;

or receiving a third optical label and a first optical packet payload that are/is sent by an optical packet sending device within a guard time between a moment for sending a second optical label and a moment for sending a corresponding second optical packet payload, wherein the second optical label is sent first and the second optical packet payload is sent later; the first optical packet payload is an optical packet payload corresponding to a first optical label that has been sent before the second optical label is sent; and the third optical label is an optical label corresponding to a third optical packet payload following the second optical packet payload; and obtaining corresponding third control information according to the third optical label; performing, according to the third control information, switch processing on the third optical packet payload corresponding to the third optical label; and performing switch processing on the first optical packet payload according to first control information, wherein the first control information is obtained according to the first optical label.

16. The method according to claim 15, wherein the performing, according to the third control information, switch processing on the third optical packet payload corresponding to the third optical label comprises:

setting up, according to a preset first duration and the third control information, an optical link for transmitting the third optical packet payload; and performing, using the optical link, switch processing on the third optical packet payload corresponding to the third optical label.

17. The method according to claim 16, wherein the performing switch processing on the first optical packet payload according to first control information comprises:

enabling a timer after the first control information is obtained, so that the timer starts timing; and when the timer reaches the first duration, setting up, according to the first control information, an optical link for transmitting the first optical packet payload.

18. The method according to claim 16, wherein the third optical label comprises length information, and the setting up, according to preset first duration and the third control information, an optical link for transmitting the third optical packet payload comprises:

comparing length information comprised in a previous optical label of the third optical label with a preset length threshold; and if the length information is less than or equal to the length threshold, setting up, according to the third control information, the optical link for transmitting the third optical packet payload; or if the length information is greater than the length threshold, enabling a timer after the third control information is obtained, so that the timer starts timing; and when the timer reaches the first duration, setting up, according to the third control information, the optical link for transmitting the third optical packet payload.

* * * * *